(12) United States Patent
Wijekoon

(10) Patent No.: US 12,191,779 B2
(45) Date of Patent: Jan. 7, 2025

(54) AC/DC CONVERTER STAGE FOR CONVERTER SYSTEM WITH INPUT SERIES STRUCTURE WITH IMPROVED COMMON MODE PERFORMANCE

(71) Applicant: Huawei Digital Power Technologies Co., Ltd., Shenzhen (CN)

(72) Inventor: Piniwan Thiwanka Bandara Wijekoon, Nuremberg (DE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 105 days.

(21) Appl. No.: 17/946,230

(22) Filed: Sep. 16, 2022

(65) Prior Publication Data

US 2023/0008233 A1    Jan. 12, 2023

Related U.S. Application Data

(63) Continuation of application No. PCT/EP2020/057221, filed on Mar. 17, 2020.

(51) Int. Cl.
*H02M 7/25* (2006.01)
*H02M 1/00* (2006.01)
(Continued)

(52) U.S. Cl.
CPC ........... *H02M 7/25* (2013.01); *H02M 1/0074* (2021.05); *H02M 1/123* (2021.05); *H02M 7/21* (2013.01); *H02M 7/217* (2013.01); *H02M 7/219* (2013.01)

(58) Field of Classification Search
CPC ........ H02M 7/21; H02M 7/217; H02M 7/219; H02M 7/25
See application file for complete search history.

(56) References Cited

U.S. PATENT DOCUMENTS

| 6,278,626 B1 | 8/2001 | Teichmann |
| 2009/0040800 A1 | 2/2009 | Sonnaillon et al. |

(Continued)

FOREIGN PATENT DOCUMENTS

| DE | 102017203233 A1 | 8/2018 |
| EP | 3093974 A1 | 11/2016 |
| EP | 3442108 A1 | 2/2019 |

OTHER PUBLICATIONS

Hong et al., "Common mode current minimization of Capacitor-Coupled Dual-Active-Bridge for SIPO MVDC-LVDC Distribution Converter", 2019 IEEE, 6 Pages.

(Continued)

*Primary Examiner* — Gary A Nash
(74) *Attorney, Agent, or Firm* — Maier & Maier, PLLC

(57) ABSTRACT

An AC/DC converter stage for a converter system with an input series structure. The AC/DC converter stage includes two input terminals for inputting an AC input voltage and at least a first circuit branch with at least two switches that are electrically connected in series at a first connection point, where a first input terminal of the two input terminals is electrically connected to the first connection point of the first circuit branch. At least one first electrical storage provides a DC output voltage and is electrically connected in parallel to the first circuit branch. At least one controllable bidirectional switch is electrically connected between the two input terminals.

20 Claims, 15 Drawing Sheets

(51) Int. Cl.
 *H02M 1/12* (2006.01)
 *H02M 7/21* (2006.01)
 *H02M 7/217* (2006.01)
 *H02M 7/219* (2006.01)

(56) References Cited

U.S. PATENT DOCUMENTS

| | | |
|---|---|---|
| 2011/0242866 A1 | 10/2011 | Takizawa |
| 2012/0044728 A1* | 2/2012 | Yatsu .................... H02M 7/219 363/126 |
| 2013/0235625 A1* | 9/2013 | Yamada .............. H02M 5/4585 363/37 |
| 2014/0203632 A1 | 7/2014 | Kouno et al. |
| 2016/0233776 A1 | 8/2016 | Nielsen |
| 2017/0012554 A1* | 1/2017 | Pu ......................... H02M 7/217 |
| 2018/0262117 A1* | 9/2018 | Lu ..................... H02M 3/33571 |
| 2019/0058414 A1* | 2/2019 | Ohnishi ................ H02M 7/487 |
| 2020/0036210 A1* | 1/2020 | Muratsu ................... H02J 7/06 |

OTHER PUBLICATIONS

Qi et al., "Common-Mode EMI Solutions for Modular Back-to-Back Converter Systems", 2013 IEEE, 7 Pages.

* cited by examiner

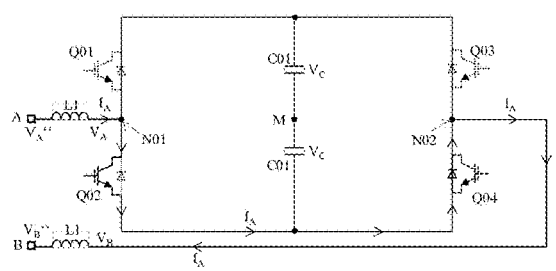 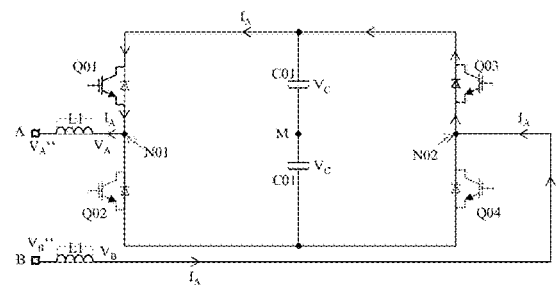
Figure 1 (a)  Figure 1 (b)

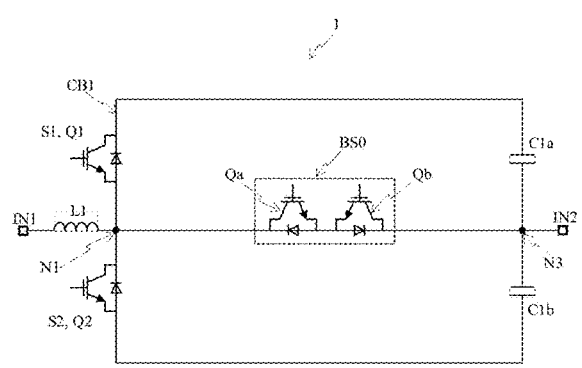
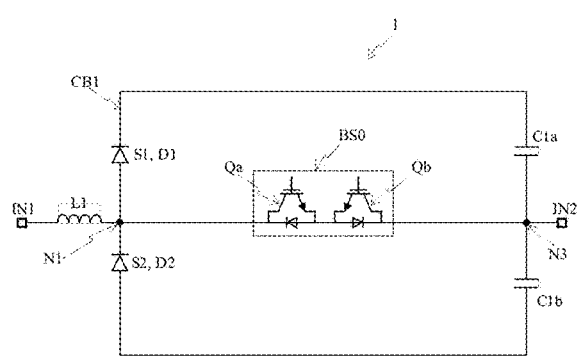
Figure 3 (a)                    Figure 3 (b)

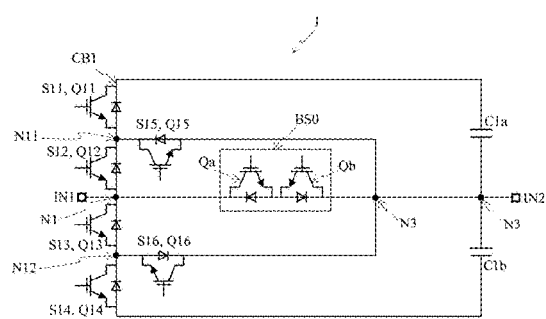 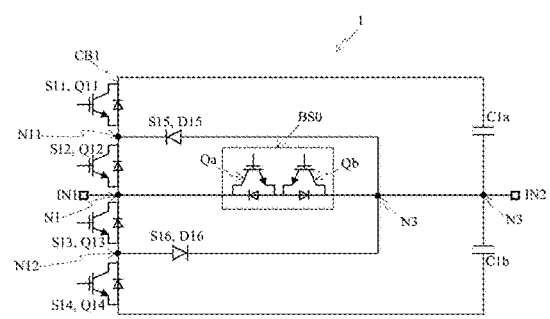
Figure 5 (a)　　　　　　　　　　　　　Figure 5 (b)

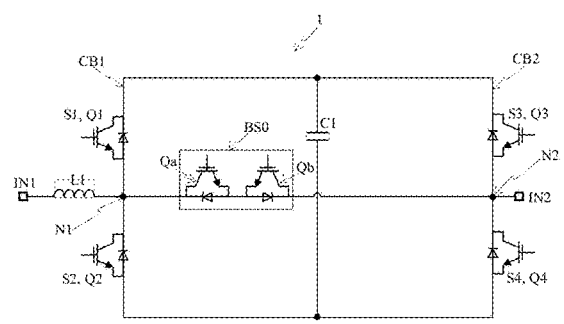 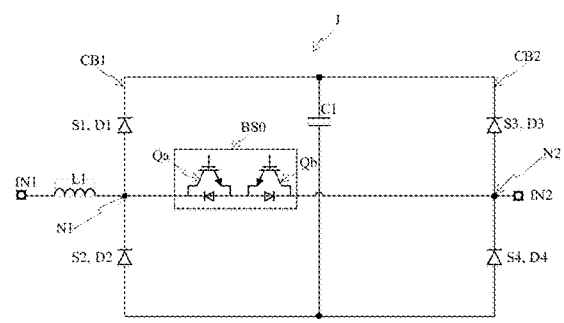
Figure 8 (a)  Figure 8 (b)

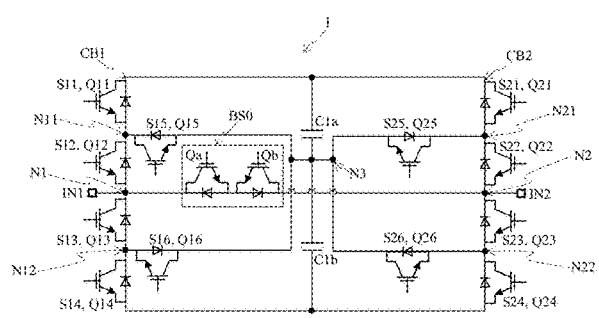 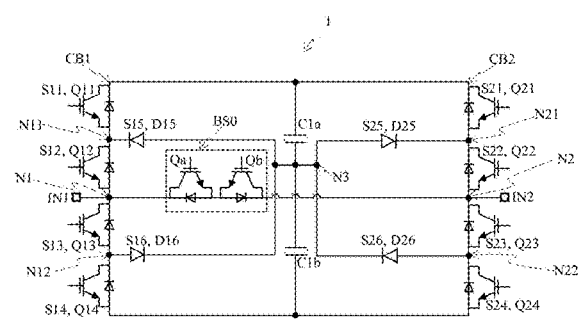
Figure 10 (a)                     Figure 10 (b)

US 12,191,779 B2

AC/DC CONVERTER STAGE FOR CONVERTER SYSTEM WITH INPUT SERIES STRUCTURE WITH IMPROVED COMMON MODE PERFORMANCE

CROSS-REFERENCE TO RELATED APPLICATIONS

This application is a continuation of International Application No. PCT/EP2020/057221, filed on Mar. 17, 2020, the disclosure of which is hereby incorporated by reference in its entirety.

TECHNICAL FIELD

The embodiments relate to an AC/DC converter stage for a converter system, the converter system comprising an input series structure, where the AC/DC converter stage has an improved common mode performance. The embodiments further relate to a converter system with an input series structure comprising at least one such AC/DC converter stage. The converter system may comprise at least two converter units that are electrically connected in series at the input of the converter system, where at least one converter unit of the at least two converter units comprises such an AC/DC converter stage as a first converter stage. The AC/DC converter stage may comprise a half bridge or a full bridge structure.

BACKGROUND

Electrical power conversion systems may be used for converting e.g. a medium voltage AC, such as an AC voltage above 1000 Volt with AC frequency of 50 or 60 Hz depending on the region, to a lower DC voltage, for supplying multiple electrical loads. Examples of such electrical loads comprise data center applications and electro vehicle (EV) charging stations etc. In case of solar photovoltaics (PV), DC power generation from PV panels are being transferred to medium voltage AC using such converter systems.

For converting an AC input voltage to a lower DC output voltage, a converter system with an input series structure comprising at least two converter units electrically connected in series at the input of the converter system may be used. Such converter units may comprise an AC/DC converter stage as a first converter stage followed by a galvanically isolated DC/DC converter stage as a second converter stage, where the isolated DC/DC converter provides the galvanic isolation between the AC input voltage and the DC output voltage.

SUMMARY

The embodiments are based on the following considerations:

In the converter system with a series input structure, the converter units electrically connected in series at the input of the converter system each may be packaged in an enclosure (housing), the enclosure being kept at ground potential for safety. High power density requirements force these packaged converter units to be very closely arranged in the converter system. For insulation purposes solid insulation material may be provided between the packaged converter units and, thus, between the high potential of the converter units and the ground potential of the enclosure. Since the enclosure may be made of metal, the provision of the solid insulation material may generate parasitic capacitances between the AC/DC converter stage and the galvanically isolated DC/DC converter stage, and the metal enclosure kept at ground potential.

The converter system with a series input structure creates high common mode voltages at the input side respectively at the grid side when an AC input voltage is supplied to the converter system. These high common mode voltages cause a high common mode current respectively a leakage current through the parasitic capacitances. These common mode currents may create several problems in the AC/DC converter stage, such as problems due to noise and problems with regard to electromagnetic compatibility (EMC), electromagnetic interference (EMI), and additional power loss caused by the common mode currents. In case the AC/DC converter stage comprises IGBTs, there may be a gate driver misfiring due to noise, ground potential drift and EMI/EMC caused by the common mode currents.

With respect to FIGS. 1 (a) and (b) the above described problem with regard to the common mode voltage in an AC/DC converter stage is exemplarily described. FIGS. 1 (a) and (b) show an example of an AC/DC converter stage comprising a full bridge structure in different switching states. The AC/DC converter stage of FIG. 1 comprises four switches in form of insulated-gate bipolar transistors (IGBT) Q01, Q02, Q03 and Q04 that are electrically connected to form a full bridge structure. That is, the two IGBTs Q01 and Q02 are electrically connected in series at a first connection point N01, where a first input terminal A of the two input terminals A and B is connected via an inductor L1 to the first connection point N01. The two IGBTs Q03 and Q04 are electrically connected in series at a second connection point N02, where the second input terminal B of the two input terminals A and B is connected via an inductor L1 to the second connection point N02. The series connection of the two IGBTs Q03 and Q04 is electrically connected in parallel to the series connection of the two IGBTs Q01 and Q02. Furthermore, two capacitors C01 electrically connected in series at a midpoint M are electrically connected in parallel to the two series connections of two IGBTs.

A diode is electrically connected in parallel to each IGBT, where the anode of the diode is connected to the emitter terminal of the respective IGBT and the cathode of the diode is connected to the collector terminal of the respective IGBT. The four IGBTs Q01, Q02, Q03 and Q04 are controllable by a control unit such that an input AC voltage at the two input terminals A and B is converted into an output DC voltage that is formed by the two voltages $V_C$ across the two capacitors C01. That is, the four IGBTs Q01, Q02, Q03 and Q04 are configured to be switched by a control unit such that an AC to DC conversion is performed.

FIG. 1 (a) shows a switching state of the four IGBTs Q01, Q02, Q03 and Q04 of the AC/DC converter stage of FIG. 1. In this switching state, the IGBT Q02 is in the conducting state (IGBT Q02 is drawn in FIG. 1 (a) with solid lines) and the IGBT Q04 is being switched on to the conducting state (IGBT Q04 is drawn in FIG. 1 (a) with dashed lines), whereas the IGBTs Q01 and Q03 are in the non-conducting state (IGBTs Q01 and Q03 are drawn in FIG. 1 (a) with dotted lines). As a result, a current $I_A$ flows from the input terminal A via the IGBT Q02 and the diode of the IGBT Q04 to the input terminal B. There is no current flow via the two capacitors C01. The common mode voltage ($V_{CM}$) of the AC/DC converter stage may be calculated by the following equation:

$$V_{CM} = \frac{V_{AM} + V_{BM}}{2}.$$

The voltage $V_{AM}$ corresponds to the voltage drop between the first connection point N01 and the midpoint M and the voltage $V_{BM}$ corresponds to the voltage drop between the second connection point N02 and the midpoint M. Therefore, in the switching state shown in FIG. 1 (a), the common mode voltage $V_{CM}$ corresponds to the negative value of the voltage across one capacitor C01 ($-V_C$), because each voltage of the voltages YAM and $V_{BM}$ corresponds to the negative value of the voltage across one capacitor C01 ($-V_C$) Thus, the common mode voltage $V_{CM}$ is nonzero and generates a common mode current, i.e. a leakage current through the parasitic capacitances to the ground potential.

FIG. 1 (b) shows a further switching state of the four IGBTs Q01, Q02, Q03 and Q04 of the AC/DC converter stage of FIG. 1. In this switching state, the IGBT Q01 is in the conducting state (IGBT Q01 is drawn in FIG. 1 (b) with solid lines) and the IGBT Q03 is being switched on to the conducting state (IGBT Q03 is drawn in FIG. 1 (b) with dashed lines), whereas the IGBTs Q02 and Q04 are in the non-conducting state (IGBTs Q02 and Q04 are drawn in FIG. 1 (b) with dotted lines). As a result, a current $I_A$ flows from the input terminal B via the diode of the IGBT Q03 and the IGBT Q01 to the input terminal A. There is no current flow via the two capacitors C01. Therefore, in the switching state shown in FIG. 1 (b), the common mode voltage $V_{CM}$ corresponds to the positive value of the voltage across one capacitor C01 (+$V_C$), because each voltage of the voltages YAM and $V_{BM}$ corresponds to the positive value of the voltage across one capacitor C01 (+$V_C$) Thus, the common mode voltage $V_{CM}$ is nonzero and generates a common mode current, i.e. a leakage current through the parasitic capacitances to the ground potential.

As described above, in the switching states shown in FIGS. 1 (a) and (b) there is no current flow via the two capacitors C01. The current $I_A$ flows from one input terminal A or B to the respective other input terminal B or A without flowing via the capacitors C01. This kind of switching state, in which there is no current flow via the electrical storage (capacitors C01) for providing the output DC voltage of the AC/DC converter stage may be referred to as the "zero state". In the AC/DC converter stage of FIG. 1 the switching states (zero states) shown in FIGS. 1 (a) and (b) each cause a common mode voltage $V_{CM}$ that is nonzero (i.e. $-V_C$ or +$V_C$) Therefore, during these switching states the common mode voltage $V_{CM}$ generates a current through the parasitic capacitances to the ground potential, i.e. common mode currents. This results in the above-described disadvantages and problems in the zero state of the AC/DC converter stage.

In other switching states of the AC/DC converter stage of FIG. 1 for performing an AC to DC conversion, which are not shown in FIGS. 1 (a) and (b), the current flows between the two input terminals A and B via the two capacitors C01. Therefore, the voltages $V_{AM}$ and $V_{BM}$ are opposing (i.e. $V_{AM}$=+$V_C$, $V_{BM}$=-$V_C$ or $V_{AM}$=$V_C$, $V_{BM}$=+$V_C$) and, thus, the common mode voltage $V_{CM}$ is zero.

In view of the above-mentioned problems and disadvantages, the embodiments aim to improve the common mode performance of a converter system with a series input structure of a AC/DC converter stage for such a converter system. An objective is to provide an AC/DC converter stage with an improved common mode performance for a converter system with an input series structure. A further objective is to provide a converter system with an input series structure having an improved common mode performance A first embodiment may provide an AC/DC converter stage for a converter system with an input series structure, where the AC/DC-converter stage includes two input terminals for inputting an AC input voltage to the AC/DC converter stage, at least a first circuit branch with at least two switches that are electrically connected in series at a first connection point, where a first input terminal of the two input terminals is electrically connected to the first connection point of the first circuit branch, at least one first electrical storage for providing a DC output voltage, the first electrical storage being electrically connected in parallel to the first circuit branch, and at least one controllable bidirectional switch electrically connected between the two input terminals.

The AC/DC converter stage according to the first embodiment may allow a current flow between the two input terminals without a current flow via the at least one first electrical storage for providing a DC output voltage and without a current flow via the at least one circuit branch of the AC/DC converter stage. Since there is no current flow via the at least one circuit branch when there is no current flow via the at least one first electrical storage for providing a DC output voltage, the common mode voltage is zero. Thus, the AC/DC converter stage according to the first embodiment allows a zero state, in which the common mode voltage is zero. Therefore, the AC/DC converter stage according to the first embodiment may overcome the above-described disadvantages and problems and includes an improved common mode performance. The AC/DC converter stage is advantageous, because the improved common mode performance is achieved inexpensively, namely by providing the at least one controllable bidirectional switch. The at least one first electrical storage may comprise or correspond to at least one output capacitor. The term "electrical energy storage" may be used as a synonym for the term "electrical storage."

The at least one controllable bidirectional switch may be configured to be controlled by a control unit. Examples of a control unit are a processor, microprocessor, controller, microcontroller, application specific integrated circuit (ASIC) or any combination thereof. The AC/DC converter stage may includes at least a half bridge structure with the at least one first circuit branch.

As a synonym for the term "connection point," the term "node" may be used. Thus, the first connection point may also be referred to as a first node. The term "electrically connected" may also be referred to by only the term "connected." The phrase, "a current flow via an electrical element" and the phrase "a current flow through an electrical element" are to be understood as synonyms. That is, e.g. a current flow via the at least one first electrical storage corresponds to a current flow through the at least one first electrical storage. Correspondingly, the phrase "a current flow via a circuit part of the AC/DC converter stage" and the phrase "a current flow through a circuit part of the AC/DC converter stage" are to be understood as synonyms. That is, a current flow via the at least one first circuit branch may correspond to a current flow through the at least one first circuit branch.

In an implementation form of the first embodiment, the at least one controllable bidirectional switch is configured to cause a zero state of the AC/DC converter stage by providing in its conducting state a low impedance current path between the two input terminals.

This enables a zero state of the AC/DC converter stage without a current flow via the at least one circuit branch (first circuit branch) of the AC/DC converter stage and, thus, a zero state of the AC/DC converter stage, in which the common mode voltage is zero. Therefore, the AC/DC converter stage includes an improved common mode performance. The AC/DC converter stage is advantageous, because the improved common mode performance is achieved inexpensively, namely by providing the at least one controllable bidirectional switch.

As outlined already above, the zero state of the AC/DC converter stage corresponds to the state, in which there is now current flow via the at least one first electrical storage for providing the DC output voltage of the AC/DC converter stage. In other words, in the zero state of the AC/DC converter stage no current flows via the at least one first electrical storage between the two input terminals when the input voltage is present at the two input terminals.

In an implementation form of the first embodiment, the AC/DC converter stage is a bipolar boost converter comprising a second electrical storage, and one of the two input terminals is electrically connected via the second electrical storage to the at least one controllable bidirectional switch.

Thus, the AC/DC converter stage with the second electrical storage is configured for a bipolar boost operation. The second electrical storage may comprise or correspond to at least one inductor or choke.

In an implementation form of the first embodiment, the at least one controllable bidirectional switch is configured to cause the zero state of the AC/DC converter stage by providing in its conducting state a current path between the two input terminals via the second electrical storage. This enables a zero state of the AC/DC converter stage, which corresponds to a bipolar boost converter, without a current flow via the at least one circuit branch (first circuit branch) of the AC/DC converter stage and, thus, a zero state of the AC/DC converter stage, in which the common mode voltage is zero. Therefore, the AC/DC converter stage corresponding to a bipolar boost converter includes an improved common mode performance. The AC/DC converter stage is advantageous, because the improved common mode performance is achieved inexpensively, namely by providing the at least one controllable bidirectional switch.

The controllable bidirectional switch may be configured to be switched on to the conducting state causing the zero state in order to cause the current of the second electrical storage to rise. As a result, electrical energy is stored in the second electrical storage during the zero state of the AC/DC converter stage, which allows the boost operation of the AC/DC converter stage.

In an implementation form of the first embodiment, the first input terminal of the two input terminals is electrically connected via the second electrical storage to the first connection point of the first circuit branch. As outlined already above, the second electrical storage allows the boost operation of the AC/DC converter stage. In an implementation form of the first embodiment, the AC/DC converter stage further includes a second circuit branch with at least two switches that are electrically connected in series at a second connection point, where the second circuit branch is electrically connected in parallel to the first circuit branch and the first electrical storage, where the second input terminal of the two input terminals is electrically connected to the second connection point of the second circuit branch.

Thus, the AC/DC converter stage may comprise at least a full bridge structure with the first circuit branch and the second circuit branch. The second input terminal of the two input terminals may be electrically connected via the second electrical storage to the second connection point of the second circuit branch. The second electrical storage allows the boost operation of the AC/DC converter stage.

In an implementation form of the first embodiment, the first electrical storage includes or corresponds to at least two first electrical storage elements electrically connected in series at a third connection point. This allows providing different DC output voltages, namely the output voltage across each of the at least two first electrical storage elements and the output voltage across the series connection of the electrical storage elements. The at least two first electrical storage elements may correspond to at least two output capacitors.

In an implementation form of the first embodiment, when the AC/DC converter stage includes only the first circuit branch, the second input terminal of the two input terminals is electrically connected to the third connection point. When the AC/DC converter stage includes only the first circuit branch, the second input terminal of the two input terminals may be electrically connected via the second electrical storage to the third connection point. The second electrical storage allows the boost operation of the AC/DC converter stage.

In an implementation form of the first embodiment, in case the AC/DC converter stage includes only the first circuit branch, the third connection point is electrically connected to at least one connection point between two switches of the first circuit branch different to the first connection point via a switch, in case the first circuit branch includes more than two switches, such as four switches, electrically connected in series. Since the first circuit branch includes more than two switches, switches configured for lower electrical powers and, thus, cheaper and less bulky switches may be used for the same AC input voltage, because the AC input voltage is divided across the respective switches of the first circuit branch. This is advantageous, as using cheaper and less bulky switches may decrease the costs for implementing the first circuit branch of the AC/DC converter stage and may decrease the size of the AC/DC converter stage.

As outlined above, a switch may electrically connect the third connection point (between the electrical storage elements of the at least one first electrical storage) to at least one connection point between two switches of the first circuit branch different to the first connection point. This switch ensures an equal voltage drop across the respective switches of the first circuit branch such that the switches of the first circuit branch are equally stressed.

In an implementation form of the first embodiment, in case the AC/DC converter stage includes the first circuit branch and the second circuit branch: The third connection point is electrically connected to at least one connection point between two switches of the first circuit branch different to the first connection point via a switch, in case the first circuit branch includes more than two switches, such as four switches, electrically connected in series. In addition, the third connection point is electrically connected to at least one connection point between two switches of the second circuit branch different to the second connection point via a switch, in case the second circuit branch includes more than two switches, such as four switches, electrically connected in series.

Since the first circuit branch and the second circuit branch each comprise more than two switches, switches configured for lower electrical powers and, thus, cheaper and less bulky switches may be used for the same AC input voltage, because the AC input voltage is divided across the respective switches of the first circuit branch and the second circuit branch. This is advantageous, as using cheaper and less bulky switches may decrease the costs for implementing the first circuit branch and the second circuit branch of the AC/DC converter stage, and may decrease the size of the AC/DC converter stage.

As outlined above, a switch may electrically connect the third connection point (between the electrical storage elements of the at least one first electrical storage) to at least one connection point between two switches of the first circuit branch different to the first connection point. Additionally, a switch may electrically connect the third connection point (between the electrical storage elements of the at least one first electrical storage) to at least one connection point between two switches of the second circuit branch different to the second connection point. These switches ensure an equal voltage drop across the respective switches of the first circuit branch and the respective switches of the second circuit branch such that the switches of the first circuit branch and the switches of the second circuit branch are equally stressed.

In an implementation form of the first embodiment, the switches comprise at least one of:
  at least one uncontrollable unidirectional semiconductor switch, such as at least one diode,
  at least one controllable semiconductor switch, and
  at least one Insulated Gate Bipolar transistor, IGBT.

An example of a controllable semiconductor switch is a transistor, such as a field effect transistor (PET), a metal-oxide field effect transistor (MOSFET), a bipolar transistor, an insulated gate bipolar transistor (IGBT) etc. An IGBT is an example of a controllable unidirectional semiconductor switch. The switches may comprise another type of controllable unidirectional semiconductor switch.

When the switch includes or corresponds to an IGBT, a diode is electrically connected in parallel to the IGBT, where the anode of the diode is connected to the emitter terminal of the IGBT and the cathode of the diode is connected to the collector terminal of the IGBT.

The switches of the one or more circuit branches, e.g. of the at least one first circuit branch or of the at least one first circuit branch and the second circuit branch, each comprise or correspond to the same switch type. For example, the switches of the one or more circuit branches may comprise or correspond to uncontrollable unidirectional semiconductor switches, such as diodes, or to controllable semiconductor switches, such as IGBTs. In this case, at least one of the switches of the one or more circuit branches may comprise or correspond to a different switch type. For example, the switches of the one or more circuit branches may comprise or correspond to diodes and at least one of these switches may comprise or correspond to an IGBT.

When the switches of the one or more circuit branches of the AC/DC converter stage comprise or correspond to controllable semiconductor switches, a control unit may control the switches of the one or more circuit branches such that the AC/DC converter stage performs an AC to DC conversion. In such a case, the controllable semiconductor switches may be IGBTs.

When the switches of the one or more circuit branches of the AC/DC converter stage comprise or correspond to uncontrollable unidirectional semiconductor switches, such as diodes, the AC to DC conversion may be performed, because different current paths form via the uncontrollable unidirectional semiconductor switches as a result of the change of the AC input voltage. In both cases, a control unit may control the controllable bidirectional switch in order to cause the zero state of the AC/DC converter, when the controllable bidirectional switch is in the conducting state.

The above-mentioned one or more switches, which may electrically connect one or more connection points between switches of a circuit branch different to the first/second connection point with the third connection point, may comprise or correspond to one or more uncontrollable unidirectional semiconductor switches, such as diodes. Alternatively, these one or more switches may comprise or correspond to one or more controllable semiconductor switches, such as IGBTs.

These one or more switches may comprise or correspond to the same switch type. At least one of these one or more switches may correspond to a different switch type. These one or more switches may comprise or correspond to the same switch type or to a different switch type compared to the switches of the one or more circuit branches of the AC/DC converter stage. For example, in case the switches of the one or more circuit branches comprise or correspond to IGBTs, these one or more switches may comprise or correspond to either IGBTs or diodes. For example, in case the switches of the one or more circuit branches comprise or correspond to diodes, these one or more switches may comprise or correspond to either IGBTs or diodes.

In an implementation form of the first embodiment, the at least one controllable bidirectional switch includes at least one controllable semiconductor switch, such as at least two IGBTs. In other words, the at least one controllable bidirectional switch may comprise or correspond to one or more controllable semiconductor switches. The at least one controllable bidirectional switch may comprise two or more IGBTs.

In an implementation form of the first embodiment, the AC/DC converter stage includes two controllable bidirectional switches electrically connected in series at a fourth connection point and configured to provide in their conducting states a current path between the two input terminals. Since the AC/DC converter stage includes two controllable bidirectional switches, controllable bidirectional switches configured for lower electrical powers and, thus, cheaper and less bulky controllable bidirectional switches, may be used for the same AC input voltage, because the AC input voltage is divided across the two controllable bidirectional switches. This is advantageous, as using cheaper and less bulky switches may decrease the costs for implementing the two controllable bidirectional switches of the AC/DC converter stage, and may decrease the size of the AC/DC converter stage.

Moreover, increasing the number of controllable bidirectional switches from one to two allows increasing the AC input voltage input to the AC/DC converter stage, because the AC input voltage is divided across the two controllable bidirectional switches. This is advantageous, as in case the AC/DC converter stage is used as a first converter stage in converter units of a converter system that are electrically connected in series at the input of the converter system less converter units are needed for the same AC input voltage. Namely, each converter unit can deal with a higher input voltage due to the two controllable bidirectional switches.

The two controllable bidirectional switches may be configured to cause the zero state of the AC/DC converter stage by providing in their conducting state a low impedance current path between the two input terminals of the AC/DC converter stage. Further, a control unit may control the two controllable bidirectional switches.

The two controllable bidirectional switches may be configured to cause the zero state of the AC/DC converter stage by providing in their conducting state a low impedance current path between the two input terminals via the second electrical storage. The second electrical storage allows the boost operation of the AC/DC converter stage.

In an implementation form of the first embodiment, when the AC/DC converter stage includes the first circuit branch and the second circuit branch, and in case the first electrical storage includes the at least two first electrical storage elements electrically connected in series at the third connection point: the third connection point and the fourth connection point are electrically connected with each other. This ensures that the AC input voltage is equally divided among the two controllable bidirectional switches, when the AC/DC converter includes two controllable bidirectional switches connected in series at the fourth connection point.

In an implementation form of the first embodiment, when the AC/DC converter stage includes only the first circuit branch: each switch of the first circuit branch includes:
two uncontrollable unidirectional semiconductor switches, such as two diodes, electrically connected in series at a fifth connection point, or
two controllable semiconductor switches, such as two IGBTs, electrically connected in series at a fifth connection point.

Since each switch of the first circuit branch includes two uncontrollable unidirectional semiconductor switches or two controllable semiconductor switches, switches configured for lower electrical powers and, thus, cheaper and less bulky switches may be used for the same AC input voltage, because the voltage across each switch is divided across the two semiconductor switches. This is advantageous, as using cheaper and less bulky switches may decrease the costs for implementing the two switches of the first circuit branch of the AC/DC converter stage, and may decrease the size of the AC/DC converter stage.

In an implementation form of the first embodiment, in case the AC/DC converter stage includes the first circuit branch and the second circuit branch: each switch of the first circuit branch and the second circuit branch includes
two uncontrollable unidirectional semiconductor switches, such as two diodes electrically connected in series at a fifth connection point, or
two controllable semiconductor switches, such as two IGBTs, electrically connected in series at a fifth connection point.

Since each switch of the first circuit branch and the second circuit branch includes two uncontrollable unidirectional semiconductor switches or two controllable semiconductor switches, switches configured for lower electrical powers and, thus, cheaper and less bulky switches may be used for the same AC input voltage, because the voltage across each switch is divided across the two semiconductor switches. This is advantageous, as using cheaper and less bulky switches may decrease the costs for implementing the switches of the first and second circuit branch of the AC/DC converter stage, may decrease the size of the AC/DC converter stage.

In an implementation form of the first embodiment, in case the first electrical storage includes the at least two first electrical storage elements electrically connected in series at the third connection point:
each switch includes one slow recovery diode and one fast recovery diode electrically connected in series at the fifth connection point, where for each switch a low current diode for providing a recovery charge is electrically connected between the fifth connection point and the third connection point; or
each switch includes two controllable semiconductor switches electrically connected in series at the fifth connection point, where for each switch a low current diode for ensuring equal voltage drop at the two controllable semiconductor switches is electrically connected between the fifth connection point and the third connection point.

Using one slow recovery diode and one fast recovery diode for each switch of the one or more circuit branches of the AC/DC converter stage reduces costs, because slow recovery diodes are cheaper than fast recovery diodes.

When each switch includes two IGBTs, a slow recovery diode may be connected in parallel to one IGBT and a fast recovery diode may be connected in parallel to the other IGBT of the two IGBTs. This reduces costs, because slow recovery diodes are cheaper than fast recovery diodes.

In order to achieve the AC/DC converter stage according to the first embodiment, some or all of the implementation forms and optional features, as described above, may be combined with each other.

A second embodiment may provide a converter system with an input series structure. The converter system includes at least two converter units that are electrically connected in series at the input of the converter system, where at least one converter unit of the at least two converter units includes an AC/DC converter stage according to the first embodiment or any implementation form thereof.

The at least two converter units each may provide a DC output voltage without being electrically connected to each other at the output of the converter system. Alternatively, the at least two converter units may be electrically connected in series or in parallel at the output of the converter system. That is, the converter system may comprise an input series output series (ISOS) structure, i.e. the at least two converter units are electrically connected in series at the output of the converter system. Alternatively, the converter system may comprise an input series output parallel (ISOP) structure, i.e. the at least two converter units are electrically connected in parallel at the output of the converter system. The at least two converter units of the converter system may be controlled by a control unit. The control unit may be a part of the converter system.

In an implementation form of the second embodiment, one converter unit of the at least two converter units includes an AC/DC converter stage according to the first embodiment or any implementation form thereof with the second electrical storage. Additionally, the other converter unit of the at least two converter units includes an AC/DC converter stage according to the first embodiment or any implementation form thereof without the second electrical storage.

Thus, one converter unit of the at least two converter units may comprise an AC/DC converter stage being a bipolar boost converter. At least one converter unit of the converter system may comprise an AC/DC converter stage being a bipolar boost converter. This is advantageous, because the converter system is configured for a boost operation due to the series connection of the converter units at the input of the converter system. This may reduce the amount of second electrical storages, needed for a boost operation of the converter system and thus reduce costs.

In an implementation form of the second embodiment, each converter unit of the at least two converter units includes an AC/DC converter stage according to the first embodiment or any implementation form thereof. Thus, each converter unit may comprise an AC/DC converter stage as a first converter stage.

In an implementation form of the second embodiment, at least one converter unit of the at least two converter units includes a galvanically isolated DC/DC converter stage as a second converter stage, and the corresponding AC/DC converter stage is configured to supply the galvanically isolated DC/DC converter stage with a DC input voltage. This provides a galvanic isolation between the input side respectively grid side and the output side of the converter system. The galvanically isolated DC/DC converter stage may comprise a solid-state transformer (SST) that provides the galvanic isolation.

Each converter unit of the at least two converter units includes a galvanically isolated DC/DC converter stage as a second converter stage, and the corresponding AC/DC converter stage is configured to supply the isolated DC/DC converter stage with a DC input voltage. In an implementation form of the second embodiment, at least one converter unit of the at least two converter units is packaged in an enclosure. Each converter unit of the at least two converter units may be packaged in an enclosure. Between the packaged converter units of the converter system, a solid insulation material may be present. The enclosure may be a metal enclosure electrically connected to ground potential.

In an implementation form of the second embodiment, the converter system includes at least one phase unit for an input AC voltage, and each phase unit includes the at least two converter units that are electrically connected in series at the input of the converter system. The converter system may includes two or more phase units for an input AC voltage with two or more phases, and each phase unit includes the at least two converter units that are electrically connected in series at the input of the converter system. When the converter system includes an input series output parallel (ISOP) structure, the at least two converter units of each phase unit are electrically connected in parallel at the output of the converter system. Furthermore, in case the converter system includes an input series output series (ISOS) structure, the at least two converter units of each phase unit are electrically connected in parallel at the output of the converter system. Alternatively, the at least two converter units of each phase unit each may provide a DC output voltage without being electrically connected to each other at the output of the converter system.

The converter system of the second embodiment and its implementation forms achieve the same advantages as the AC/DC converter stage of the first embodiment and its respective implementation forms. In order to achieve the converter system according to the second embodiment, some or all of the implementation forms and optional features, as described above, may be combined with each other.

All devices, elements, units, and means could be implemented in the software or hardware elements or any kind of combination thereof. All steps which are performed by the various entities as well as the functionalities described to be performed by the various entities are intended to mean that the respective entity is adapted to or configured to perform the respective steps and functionalities. Even if, in the following description of embodiments, a functionality or step to be performed by external entities is not reflected in the description of a detailed element of that entity which performs that step or functionality, it should be clear for a skilled person that these methods and functionalities can be implemented in respective software or hardware elements, or any kind of combination thereof.

BRIEF DESCRIPTION OF THE DRAWINGS

The above described implementation forms will be explained in the following description of embodiments in relation to the enclosed drawings, in which FIG. 1 (a) shows an example of an AC/DC converter stage comprising a full bridge structure in different switching states.

FIG. 1 (b) shows an example of an AC/DC converter stage comprising a full bridge structure in different switching states.

FIG. 3 (a) shows an exemplary implementation of the AC/DC converter stage shown in FIG. 2.

FIG. 3 (b) shows an exemplary implementation of the AC/DC converter stage shown in FIG. 2.

FIG. 5 (a) shows an exemplary implementation of the AC/DC converter stage shown in FIG. 4.

FIG. 5 (b) shows an exemplary implementation of the AC/DC converter stage shown in FIG. 4.

FIG. 8 (a) shows an exemplary implementation of the AC/DC converter stage shown in FIG. 7.

FIG. 8 (b) shows an exemplary implementation of the AC/DC converter stage shown in FIG. 7.

FIG. 10 (a) shows an exemplary implementation of the AC/DC converter stage shown in FIG. 9.

FIG. 10 (b) shows an exemplary implementation of the AC/DC converter stage shown in FIG. 9.

FIG. 11 (b) shows an AC/DC converter stage according to an embodiment, the AC/DC converter stage comprising a full bridge structure.

FIG. 12 (b) each show an AC/DC converter stage according to an embodiment, the AC/DC converter stage comprising a full bridge structure.

FIG. 14 (b) shows a converter system according to an embodiment.

FIG. 14 (c) shows a converter system according to an embodiment.

DETAILED DESCRIPTION OF THE EMBODIMENTS

In FIGS. 2 to 15 corresponding elements are labelled by the same reference signs.

Figure 2:
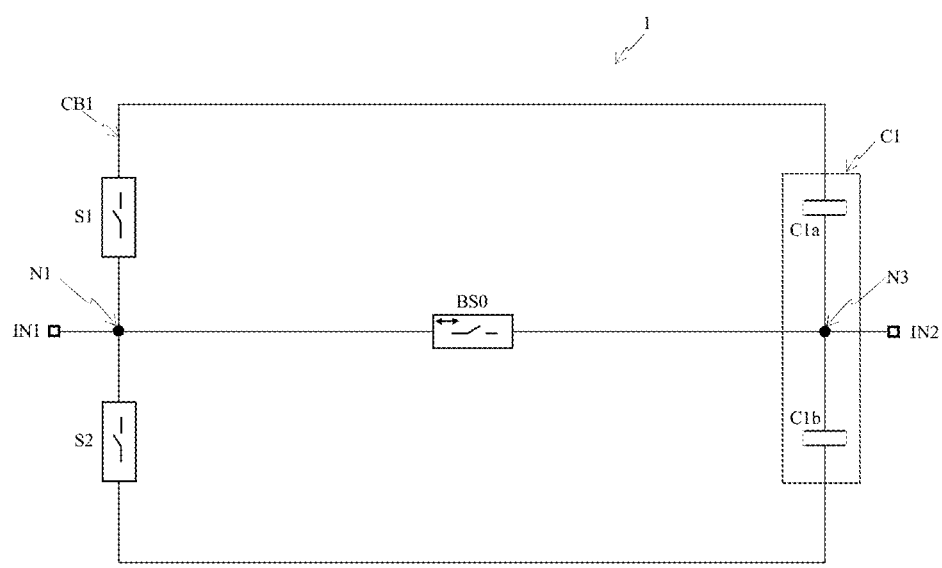
FIG. 2 shows an AC/DC converter stage according to an embodiment, the AC/DC converter stage comprising a half bridge structure.

FIG. 2 shows an AC/DC converter stage according to an embodiment, where the AC/DC converter stage includes a half bridge structure. The above description with respect to an AC/DC converter stage according to a first embodiment and its implementation forms is correspondingly valid for the AC/DC converter stage 1 of FIG. 2. The AC/DC converter stage according to FIG. 2 includes two input terminals IN1 and IN2 for inputting an AC input voltage to the AC/DC converter stage, one circuit branch CB1 (first circuit branch), one first electrical storage C1 for providing a DC output voltage and one controllable bidirectional switch BS0.

The circuit branch CB1 includes two switches S1 and S2 that are electrically connected in series at a connection point N1 (first connection point). The first electrical storage C1 includes two first electrical storage elements in form of two output capacitors C1a and C1b that are electrically connected in series at a connection point N3 (third connection point). The first electrical storage C1 is electrically connected in parallel to the circuit branch CB1. The first input terminal IN1 of the two input terminals is electrically connected to the connection point N1 (first connection point) and the second input terminal IN2 of the two input terminals is electrically connected to the connection point N3 (third connection point). The controllable bidirectional switch BS0 is electrically connected between the two input terminals IN 1 and IN2. The controllable bidirectional switch BS0 is electrically connected between the connection point N1 of the circuit branch CB1 and the connection point N3 of the first electrical storage C1.

According to an embodiment, the AC/DC converter stage with the half bridge structure may be a bipolar boost converter comprising a second electrical storage, where either the first input terminal IN1 or the second input terminal IN2 is electrically connected via the second electrical storage to the at least one controllable bidirectional switch BS0 (not shown in FIG. 2). Alternatively, the first input terminal IN1 and the second input terminal IN2 each may be electrically connected via a second electrical storage to the controllable bidirectional switch BS0. The second electrical storage may comprise or correspond to at least one inductor or choke.

The controllable bidirectional switch BS0 is configured to cause the zero state of the AC/DC converter stage 1 by providing in its conducting state a low impedance current path between the two input terminals IN1 and IN2 of the AC/DC converter stage 1. Thus, in the zero state, i.e. in the state in which no current flows via the first electrical storage C1 for providing a DC output voltage, no current flows via the circuit branch CB1, such as via the two switches S1 and S2 of the first circuit branch CB1. Therefore, in the zero state of the AC/DC converter stage 1 shown in FIG. 2 the common mode voltage is zero. As a result, the AC/DC converter stage 1 of FIG. 2 includes an improved common mode performance.

FIGS. 3 (a) and (b) show two exemplary implementations of the AC/DC converter stage shown in FIG. 2. The above description of the AC/DC converter stage of FIG. 2 is correspondingly valid for the two exemplary implementations shown in FIG. 3 (a) and (b). According to FIG. 3 (a), the AC/DC converter stage 1 includes as the two switches S1 and S2 of the circuit branch CB1 two controllable semiconductor switches Q1 and Q2 in form of two insulated gate bipolar transistors (IGBTs), where a diode is electrically connected in parallel to each IGBT. The anode of the diode is connected to the emitter terminal of the respective IGBT and the cathode of the diode is connected to the collector terminal of the respective IGBT. The emitter terminal of the IGBT Q1 and the collector terminal of the IGBT Q2 are electrically connected at the connection point N1. Thus, the AC/DC converter stage 1 of FIG. 3 (a) corresponds to an actively switched AC/DC converter stage with a half bridge structure, where the AC to DC conversion is achieved by controlling the two IGBTs Q1 and Q2.

According to the embodiment of FIG. 3 (a), the first input terminal IN1 is electrically connected via the second electrical storage in form of an inductor/choke L1 to the controllable bidirectional switch BS0. As mentioned already above, instead of the first input terminal IN1, the second input terminal IN2 may be electrically connected via the second electrical storage to the controllable bidirectional switch BS0. As a result of the second electrical storage L1 the AC/DC converter stage 1 is configured to perform a boost operation and, thus, corresponds to a bidirectional boost converter.

As shown in FIG. 3 (a), the controllable bidirectional switch BS0 may be implemented by two IGBTs Qa and Qb that are electrically connected in series at their emitter terminals. The collector terminal of the IGBT Qa is electrically connected to the connection point N1 and the collector terminal of the IGBT Qb is electrically connected to the connection point N3. A diode is connected to each IGBT Qa and Qb, such that the anode of the diode is connected to the respective emitter terminal and the cathode of the diode is connected to the respective collector terminal.

The AC/DC converter stage of FIG. 3 (b) differs from the AC/DC converter stage of FIG. 3 (a) with respect to the implementation of the two switches S1 and S2 of the circuit branch CBE Namely, according to FIG. 3 (b) the AC/DC converter stage 1 includes as the two switches S1 and S2 of the circuit branch CB1 two uncontrollable unidirectional semiconductor switches D1 and D2 in form of two diodes. The anode of the diode D1 and the cathode of the diode D2 are electrically connected to the connection point N1. The switches D1 and D2 of the AC/DC converter stage 1 of FIG. 3 (b) are switched between the conducting state and the non-conducting state by the change of the AC input voltage input to the two input terminals IN land IN2 achieving the AC to DC conversion of the AC input voltage to a DC output voltage. That is, the AC to DC conversion is achieved, because different current paths form via the diodes D1 and D2 as a result of the change of the AC input voltage.

In both embodiments of FIG. 3, the controllable bidirectional switch BS0 may be controlled/switched by a control unit in order to achieve the improved common mode performance, as outlined already above. According to FIGS. 3 (a) and (b), the switches S1 and S2 are of the same switch type. According to an embodiment, the switches S1 and S2 may be of a different switch type, as outlined already above (not shown in FIG. 3).

Figure 4:
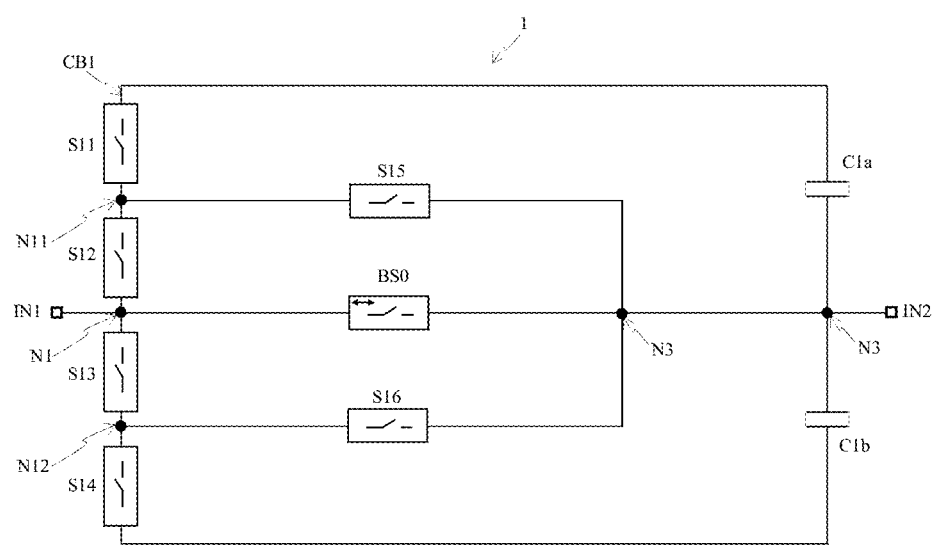
FIG. 4 shows an AC/DC converter stage according to an embodiment, the AC/DC converter stage comprising a half bridge structure.

FIG. 4 shows an AC/DC converter stage according to an embodiment, the AC/DC converter stage comprising a half bridge structure. The above description of the AC/DC converter stage according to FIG. 2 is correspondingly valid for the AC/DC converter stage 1 of FIG. 4. The AC/DC converter stage 1 according to FIG. 4 differs from the AC/DC converter stage according to FIG. 2, in that the circuit branch CB1 of the AC/DC converter stage 1 according to FIG. 4 includes more than two switches. Therefore, in the following the differences between the AC/DC converter stage of FIG. 2 and the AC/DC converter stage of FIG. 4 are described.

According to FIG. 4, the circuit branch (first circuit branch) CB1 of the AC/DC converter stage 1 includes four switches S11, S12, S13 and S14 that are electrically connected in series. The switches S12 and S13 are electrically connected at the connection point N1 (first connection point), to which the first input terminal IN1 is connected to. The switches S11 and S12 are electrically connected at the connection point N11 and the switches S13 and S14 are electrically connected at the connection point N12.

The AC/DC converter stage 1 according to FIG. 4 is advantageous with respect to the AC/DC converter stage according to FIG. 2. Namely, since the circuit branch CB1 includes more than two switches (four switches S11, S12, S13, S14), switches configured for lower electrical powers and, thus, cheaper and less bulky switches may be used for the same AC input voltage. Namely, the AC input voltage is divided across the respective switches (i.e. across switches S11 and S12 respectively across switches S13 and S14) of the circuit branch CB1 when the AC input voltage is present between the two input terminals IN1 and IN2. This is advantageous, as using cheaper and less bulky switches may decrease the costs for implementing circuit branch CB1 of the AC/DC converter stage 1, such as the circuit branch CB1, and may decrease the size of the AC/DC converter stage 1. Further, according to FIG. 4 the connection point N3 (third connection point) between the two first electrical storage elements (output capacitors) C1a and C1b is electrically connected to the connection point N11 via a switch S15 and to the connection point N12 via a switch S16.

The switch S15 ensures an equal voltage drop across the switches S11 and S12 of the circuit branch CB1, such that the switches S11 and S12 of the circuit branch CB1 are equally stressed. The switch S16 ensures an equal voltage drop across the switches S13 and S14 of the circuit branch CB1, such that the switches S13 and S14 of the circuit branch CB1 are equally stressed. That is, the switches S15 and S16 ensure an equal voltage drop across the respective switches of the circuit branch CB1 such that the switches S11, S12, S13 and S14 of the circuit branch CB1 are equally stressed.

According to an embodiment, the number of switches of the circuit branch CB1 may be greater than, the number of switches (four switches S11, S12, S13 and S14) shown in FIG. 4. Accordingly, the number of switches for ensuring an equal voltage drop across respective switches of the circuit branch CB1 may be greater than the number (two switches S15 and S16) shown in FIG. 4.

FIGS. 5 (a) and (b) show two exemplary implementations of the AC/DC converter stage shown in FIG. 4. The above description of the AC/DC converter stage of FIG. 4 is correspondingly valid for the two exemplary implementations shown in FIGS. 5 (a) and (b). According to FIG. 5 (a) the AC/DC converter stage 1 includes as the four switches S11, S12, S13 and S14 of the circuit branch CB1 four controllable semiconductor switches Q11, Q12, Q13 and Q14 in form of four IGBTs, where a diode is electrically connected in parallel to each IGBT. The anode of the diode is connected to the emitter terminal of the respective IGBT and the cathode of the diode is connected to the collector terminal of the respective IGBT. The emitter terminal of the IGBT Q11 and the collector terminal of the IGBT Q12 are electrically connected at the connection point N11. The emitter terminal of the IGBT Q12 and the collector terminal of the IGBT Q13 are electrically connected at the connection point N1. The emitter terminal of the IGBT Q13 and the collector terminal of the IGBT Q14 are electrically connected at the connection point N12.

Thus, the AC/DC converter stage 1 of FIG. 5 (a) corresponds to an actively switched AC/DC converter stage, where the AC to DC conversion is achieved by controlling the four IGBTs Q11, Q12, Q13 and Q14. A control unit may control the four IGBTs Q11, Q12, Q13 and Q14. The controllable bidirectional switch BS0 of the AC/DC converter stage of FIG. 5 (a) is implemented as described with respect to the controllable bidirectional switch BS0 of the AC/DC converter stage of FIG. 3 (a).

According to FIG. 5 (a), the switches S15 and S16 of the AC/DC converter stage 1 are implemented as controllable semiconductor switches Q15 and Q16 in form of IGBTs, respectively, where a diode is electrically connected in parallel to each IGBT. The anode of the diode is connected to the emitter terminal of the respective IGBT and the cathode of the diode is connected to the collector terminal of the respective IGBT. The collector terminal of the IGBT Q15 is connected to the connection point N11 and the emitter terminal of the IGBT Q15 is connected to the connection point N3 (third connection point). The emitter terminal of the IGBT Q16 is connected to the connection point N12 and the collector terminal of the IGBT Q16 is connected to the connection point N3 (third connection point). The IGBTs Q15 and Q16 may be controlled to ensure an equal voltage drop across the IGBTs Q11, Q12, Q13 and Q14 of the circuit branch CB1 such that the IGBTs Q11, Q12, Q13 and Q14 are equally stressed.

The AC/DC converter stage of FIG. 5 (b) differs from the AC/DC converter stage of FIG. 5 (a) with respect to the implementation of the two switches S15 and S16. Namely, according to FIG. 5(b), the AC/DC converter stage 1 includes as the two switches S15 and S16 two uncontrollable unidirectional semiconductor switches D15 and D16 in form of two diodes. The cathode of the diode D15 is connected to the connection point N11 and the anode of the diode D15 is connected to the connection point N3. The anode of the diode D16 is connected to the connection point N12 and the cathode of the diode D16 is connected to the connection point N3. In both embodiments of FIG. 5 the controllable bidirectional switch BS0 may be controlled/switched by a control unit in order to achieve the improved common mode performance, as outlined already above.

According to FIGS. 5 (a) and (b), the switches S11, S12, S13 and S14 of the circuit branch CB1 are of the same switch type. According to an embodiment, at least one switch of the circuit branch CB1 may be of a different switch type, as outlined already above (not shown in FIG. 5). According to a further embodiment, the switches S11, S12, S13 and S14 of the circuit branch CB1 may be of a different switch type than shown in FIGS. 5 (a) and 5 (b). For example, they may be a different type of controllable semiconductor switch or they may be an uncontrollable unidirectional switch type, such as diodes. According to FIGS. 5 (a) and (b), the switches S15 and S16 are of the same switch type. According to an embodiment, one of the switches S15 or S16 may be of a different switch type, as outlined already above (not shown in FIG. 5).

Figure 6:
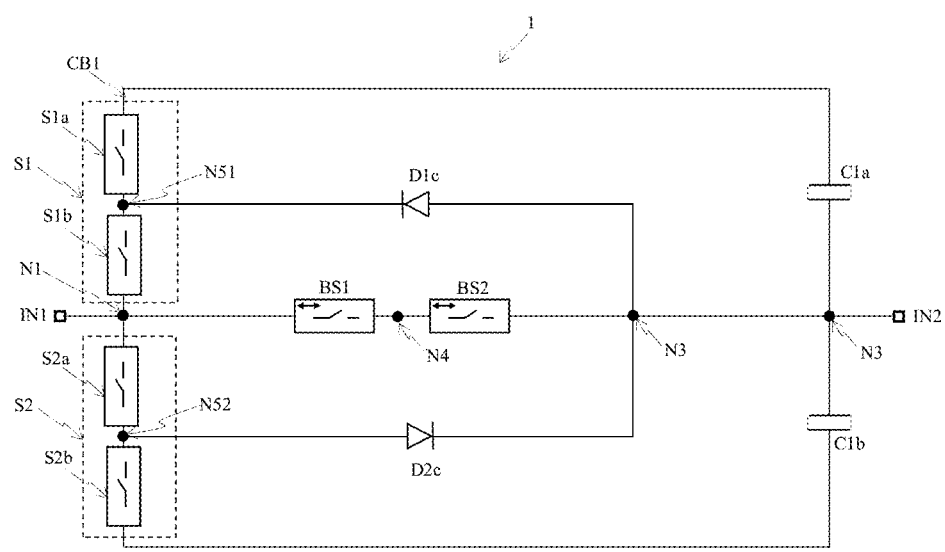
FIG. 6 shows an AC/DC converter stage according to an embodiment, the AC/DC converter stage comprising a half bridge structure.

FIG. 6 shows an AC/DC converter stage according to an embodiment, the AC/DC converter stage comprising a half bridge structure. The above description of the AC/DC converter stage according to FIG. 2 is correspondingly valid for the AC/DC converter stage 1 of FIG. 6. The AC/DC converter stage 1 according to FIG. 6 differs from the AC/DC converter stage according to FIG. 2 in that each switch of the two switches S1 and S2 of the circuit branch CB1 of the AC/DC converter stage 1 according to FIG. 6 includes two switches electrically connected in series and in that the AC/DC converter stage of FIG. 6 includes two controllable bidirectional switches BS1 and BS2. Therefore, in the following the differences between the AC/DC converter stage of FIG. 2 and the AC/DC converter stage of FIG. 6 are described.

As shown in FIG. 6, the switch S1 includes two switches S1a and S1b electrically connected at a connection point N51 and the switch S2 includes two switches S2a and S2b electrically connected at a connection point N52. That is, each switch S1/S2 of the circuit branch CB1 includes two switches S1a, S1b/S2a, S2b that are connected in series at a connection point N51/N52 (fifth connection point). The two switches S1a, S1b/S2a, S2b of each switch S1/S2 of the circuit branch CB1 may be two uncontrollable unidirectional switches, such as two diodes, or two controllable semiconductor switches, such as two IGBTs.

Since each switch of the first circuit branch CB1 includes two switches, switches configured for lower electrical powers and, thus, cheaper and less bulky switches may be used for the same AC input voltage. Namely, the voltage across the switch S1 is divided across the corresponding two switches S1a and S1b, and the voltage across the switch S2 is divided across the corresponding switches S2a and S2b. This is advantageous, as using cheaper and less bulky switches may decrease the costs for implementing the two switches S1 and S2 of the circuit branch CB1 of the AC/DC converter stage and may decrease the size of the AC/DC converter stage.

Moreover, according to the embodiment of FIG. 6, the AC/DC converter stage 1 includes two controllable bidirectional switches BS1 and BS2 electrically connected in series at a connection point N4 (fourth connection point). The two controllable bidirectional switches BS1 and BS2 are configured to provide in their conducting states a low impedance current path between the two input terminals IN1 and IN2. The two controllable bidirectional switches BS1 and BS2 may be configured to cause the zero state of the AC/DC converter stage 1 by providing in their conducting state a low impedance current path between the two input terminals IN1 and IN2 of the AC/DC converter stage 1. Thus, in the zero state, that is, in the state in which no current flows via the first electrical storage C1 for providing a DC output voltage, no current flows via the two switches S1 and S2 of the first circuit branch CB1. Therefore, in the zero state of the AC/DC converter stage 1 shown in FIG. 6 the common mode voltage is zero. As a result, the AC/DC converter stage 1 of FIG. 6 includes an improved common mode performance.

According to FIG. 6, the controllable bidirectional switch BS1 is connected between the connection point N1 (first connection point) and the connection point N4 and the controllable bidirectional switch BS2 is connected between the connection point N4 and the connection point N3 (third connection point). Since the AC/DC converter stage 1 includes two controllable bidirectional switches BS1 and BS2, controllable bidirectional switches configured for lower electrical powers and, thus, cheaper and less bulky switches, may be used for the same AC input voltage, because the AC input voltage is divided across the two controllable bidirectional switches BS1 and BS2. This is advantageous, as using cheaper and less bulky switches may decrease the costs for implementing the two controllable bidirectional switches BS1 and BS2 of the AC/DC converter stage, and may decrease the size of the AC/DC converter stage.

Moreover, increasing the number of controllable bidirectional switches from one controllable bidirectional switch BS0 (as it is the case in the AC/DC converter stage of FIG. 2) to two controllable bidirectional switches BS1 and BS2 (as it is the case in FIG. 6) allows increasing the AC input voltage input to the AC/DC converter stage 1. Namely, the AC input voltage is divided across the two controllable bidirectional switches BS1 and BS2. This is advantageous, as in case the AC/DC converter stage 1 is used as a first converter stage in converter units of a converter system that are electrically connected in series at the input of the converter system (not shown in FIG. 6, but in FIGS. 13 to 15) less converter units are needed for the same AC input voltage. Namely, each converter unit can deal with a higher input voltage due to the two controllable bidirectional switches BS1 and BS2. The two controllable bidirectional switches BS1 and BS2 are configured to cause the zero state of the AC/DC converter stage by providing in their conducting state a low impedance current path between the two input terminals IN1 and IN2 of the AC/DC converter stage 1.

According to FIG. 6, a low current diode D1c is electrically connected between the connection point N51 and the connection point N3 (third connection point) between the two output capacitors C1a and C1b, where the cathode is connected to the connection point N51 and the anode of the diode D1c is connected to the connection point N3. A low current diode D2c is electrically connected between the connection point N52 and the connection point N3 (third connection point), where the anode is connected to the connection point N52 and the cathode of the diode D2c is connected to the connection point N3.

According to an embodiment, each switch of the switches S1 and S2 of the circuit branch CB1 may comprise one slow recovery diode and one fast recovery diode, where the low current diodes D1c and D2c are configured for providing a recovery charge. For example, the switches S1b and S2a each may be implemented as a slow recovery diode and the switches S1a and S2b each may be implemented as a fast recovery diode. Using one slow recovery diode and one fast recovery diode for each switch S1, S2 of the circuit branch CB1 of the AC/DC converter stage 1 reduces costs, because slow recovery diodes are cheaper than fast recovery diodes.

According to an embodiment, each switch of the switches S1 and S2 of the circuit branch CB1 may comprise two controllable semiconductor switches, such as two IGBTs, where the low current diodes D1c and D2c are configured for ensuring equal voltage drop at the two controllable semiconductor switches. In case each switch S1, S2 includes two IGBTs, a slow recovery diode may be connected in parallel to one IGBT and a fast recovery diode may be connected in parallel to the other IGBT of the two IGBTs. For example, a slow recover diode may be connected in parallel to the IGBTs S1b and S2a and a fast recovery diode may be connected in parallel to the other IGBTs S1a and S2b. This reduces costs because slow recovery diodes are cheaper than fast recovery diodes.

Figure 7:
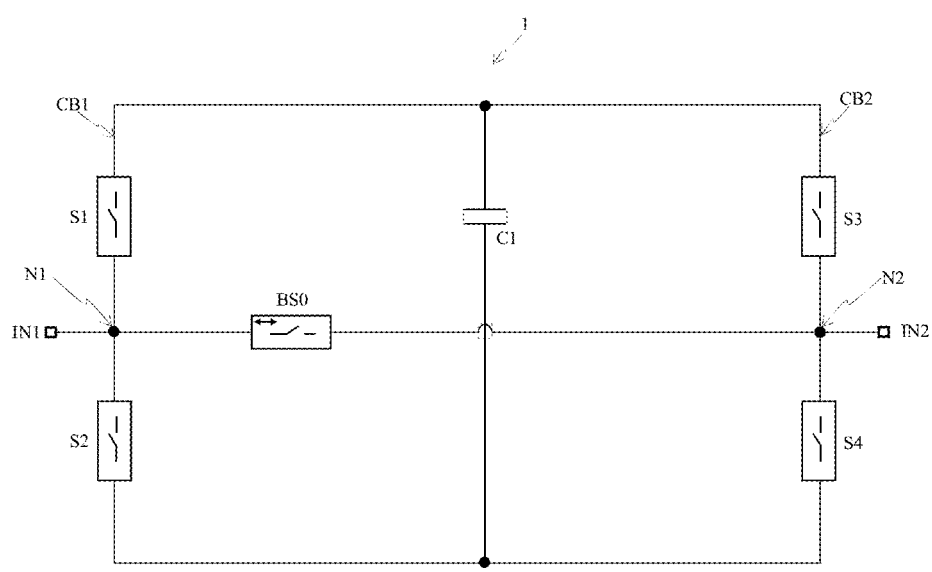
FIG. 7 shows an AC/DC converter stage according to an embodiment, the AC/DC converter stage comprising a full bridge structure.

FIG. 7 shows an AC/DC converter stage according to an embodiment, the AC/DC converter stage comprising a full bridge structure. The above description of the AC/DC converter stage according to FIG. 2 is correspondingly valid for the AC/DC converter stage 1 of FIG. 7. The AC/DC converter stage 1 according to FIG. 7 differs from the AC/DC converter stage according to FIG. 2, in that the AC/DC converter stage of FIG. 7 includes a full bridge structure, whereas the AC/DC converter stage of FIG. 2 includes a half bridge structure. Therefore, in the following the differences between the AC/DC converter stage of FIG. 2 and the AC/DC converter stage of FIG. 7 are described.

The AC/DC converter stage 1 according to FIG. 7 includes two input terminals IN1 and IN2 for inputting an AC input voltage to the AC/DC converter stage 1, two circuit branches CB1 (first circuit branch) and CB2 (second circuit branch), one first electrical storage C1 for providing a DC output voltage and one controllable bidirectional switch BS0. The first circuit branch CB1 includes two switches S1 and S2 that are electrically connected in series at a first connection point NE The second circuit branch CB2 includes two switches S3 and S4 that are electrically connected in series at a second connection point N2. The first electrical storage C1 includes or corresponds to a first electrical storage element in form of an output capacitor C1.

Alternatively, the first electrical storage C1 may comprise or correspond to at least two first electrical storage elements in form of two output capacitors C1a and C1b that are electrically connected in series at a third connection point N3 (not shown in FIG. 7). The first circuit branch CB1, the second circuit branch CB2 and the first electrical storage C1 are electrically connected in parallel to each other. The first input terminal IN1 of the two input terminals is electrically connected to the first connection point N1 and the second input terminal IN2 of the two input terminals is electrically connected to the second connection point N2. The controllable bidirectional switch BS0 is electrically connected between the two input terminals IN1 and IN2. The controllable bidirectional switch may be electrically connected between the first connection point N1 of the first circuit branch CB1 and the second connection point N2 of the second circuit branch CB2.

According to an embodiment, the AC/DC converter stage 1 with the full bridge structure may be a bipolar boost converter comprising a second electrical storage, where either the first input terminal IN1 or the second input terminal IN2 is electrically connected via the second electrical storage to the at least one controllable bidirectional switch BS0 (not shown in FIG. 7). Alternatively, the first input terminal IN1 and the second input terminal IN2 each may be electrically connected via a second electrical storage to the controllable bidirectional switch BS0. The second electrical storage may comprise or correspond to at least one inductor or choke.

In case the AC/DC converter stage 1 is a bipolar boost converter comprising a second electrical storage in form of at least one inductor or choke, which for example is electrical connected between the first input terminal IN1 and the controllable bidirectional switch BS0 (not shown in FIG. 7), the boost operation may be shortly described as follows:
- In case the controllable bidirectional switch BS0 is switched on to the conducting state, the current of the least one inductor/choke (second electrical storage) increases storing electrical energy in the inductor/choke.
- Once the controllable bidirectional switch BS0 is switched off to the non-conducting state, the input voltage and the voltage across the at least one inductor/choke will push the current through the circuit branches CB1 and CB2 to charge the first electrical storage C1 (output capacitor).

The controllable bidirectional switch BS0 is configured to cause the zero state of the AC/DC converter stage 1 by providing in its conducting state a low impedance current path between the two input terminals IN1 and IN2 of the AC/DC converter stage 1. Thus, in the zero state, i.e. in the state in which no current flows via the first electrical storage C1 for providing a DC output voltage, no current flows via the first circuit branch CB1 and the second circuit branch CB2. In the zero state, no current flows via any one of the switches S1, S2, S3 and S4 of the AC/DC converter stage 1. Therefore, in the zero state of the AC/DC converter stage 1 shown in FIG. 7 the common mode voltage is zero. As a result, the AC/DC converter stage 1 of FIG. 7 includes an improved common mode performance.

FIGS. 8 (a) and (b) show two exemplary implementations of the AC/DC converter stage shown in FIG. 7. The above description of the AC/DC converter stage of FIG. 7 is correspondingly valid for the two exemplary implementations shown in FIGS. 8 (a) and (b). The AC/DC converter stage 1 according to FIG. 8 differs from the AC/DC converter stage according to FIG. 3, in that the AC/DC converter stage of FIG. 8 includes a full bridge structure, whereas the AC/DC converter stage of FIG. 3 includes a half bridge structure. Therefore, the above description of the two exemplary implementations of the AC/DC converter stage according to FIGS. 3 (a) and (b) is correspondingly valid for the two exemplary implementations of the AC/DC converter stage shown in FIGS. 8 (a) and (b).

According to FIG. 8 (a), the AC/DC converter stage 1 includes as the four switches S1, S2, S3 and S4 of the first circuit branch CB1 and second circuit branch CB2 four controllable semiconductor switches Q1, Q2, Q3 and Q4 in form of four insulated gate bipolar transistors (IGBTs). A diode is electrically connected in parallel to each IGBT, where the anode of the diode is connected to the emitter terminal of the respective IGBT and the cathode of the diode connected to the collector terminal of the respective IGBT. The emitter terminal of the IGBT Q1 and the collector terminal of the IGBT Q2 are electrically connected at the first connection point N1. The emitter terminal of the IGBT Q3 and the collector terminal of the IGBT Q4 are electrically connected at the second connection point N2. Thus, the AC/DC converter stage 1 of FIG. 8 (a) corresponds to an actively switched AC/DC converter stage with a full bridge structure, where the AC/DC conversion is achieved by controlling the four IGBTs Q1, Q2, Q3 and Q4.

According to the embodiment of FIG. 8 (a), the first input terminal IN1 is electrically connected via a second electrical storage L1 in form of an inductor/choke to the controllable bidirectional switch BS0. As mentioned already above, instead of the first input terminal IN1, the second input terminal IN2 may be electrically connected via the second electrical storage L1 to the controllable bidirectional switch BS0. As a result of the second electrical storage L1 the AC/DC converter stage 1 is configured to perform a boost operation and, thus, corresponds to a bidirectional boost converter.

As shown in FIG. 8 (a) the controllable bidirectional switch BS0 may be implemented by two IGBTs Qa and Qb that are electrically connected in series at their emitter terminals. The collector terminal of the IGBT Qa is electrically connected to the first connection point N1 and the collector terminal of the IGBT Qb is electrically connected to the second connection point N2. A diode is connected to each IGBT Qa and Qb, such that the anode of the diode is connected to the respective emitter terminal and the cathode of the diode is connected to the respective collector terminal. The boost operation of the AC/DC converter stage 1 of FIG. 8 (a) may be shortly described as follows:

In case the two IGBTs Qa and Qb of the controllable bidirectional switch BS0 are switched on to the conducting state, the current of the inductor/choke L1 (second electrical storage) increases storing electrical energy in the inductor/choke L1.

Once the two IGBTs Qa and Qb are switched off to the non-conducting state, the input voltage and the voltage across the inductor/choke L1 will push the current through the circuit branches CB1 and CB2 to charge the first electrical storage C1 (output capacitor), where the IGBTs Q1, Q2, Q3 and Q4 are controlled, accordingly.

The AC/DC converter stage of FIG. 8 (b) differs from the AC/DC converter stage of FIG. 8 (a) with respect to the implementation of the two switches S1 and S2 of the first circuit branch CB1 and the two switches S3 and S4 of the second circuit branch CB2. Namely, according to FIG. 8 (b), the AC/DC converter stage 1 includes as the two switches S1 and S2 of the first circuit branch CB1 two uncontrollable unidirectional semiconductor switches D1 and D2 in form of two diodes. The anode of the diode D1 and the cathode of the diode D2 are electrically connected to the first connection point N1. Further, the AC/DC converter stage 1 includes as the two switches S3 and S4 of the second circuit branch CB2 two uncontrollable unidirectional semiconductor switches D3 and D4 in form of two diodes. The anode of the diode D3 and the cathode of the diode D4 are electrically connected to the second connection point N2.

The switches D1, D2, D3 and D4 of the AC/DC converter stage 1 of FIG. 8 (b) are switched between the conducting state and the non-conducting state by the change of the AC input voltage input to the two input terminals IN1 and IN2 achieving the AC to DC conversion of the AC input voltage to a DC output voltage. That is, the AC to DC conversion is achieved, because different current paths form via the diodes D1, D2, D3 and D4 as a result of the change of the AC input voltage. The boost operation of the AC/DC converter stage 1 of FIG. 8 (b) may be shortly described as follows:

In case the two IGBTs Qa and Qb of the controllable bidirectional switch BS0 are switched on to the conducting state, the current of the inductor/choke L1 (second electrical storage) increases storing electrical energy in the inductor/choke L1.

Once the two IGBTs Qa and Qb are switched off to the non-conducting state, the input voltage and the voltage across the inductor/choke L1 will push the current through the corresponding diodes to charge the first electrical storage C1 (output capacitor).

In both embodiments of FIG. 8 the controllable bidirectional switch BS0 may be controlled/switched by a control unit in order to achieve the improved common mode performance, as outlined already above. According to FIGS. 8 (a) and (b), the switches S1, S2, S3 and S4 are of the same switch type. According to an embodiment, at least one of the switches S1, S2, S3 and S4 may be of a different switch type, as outlined already above (not shown in FIG. 8).

Figure 9:
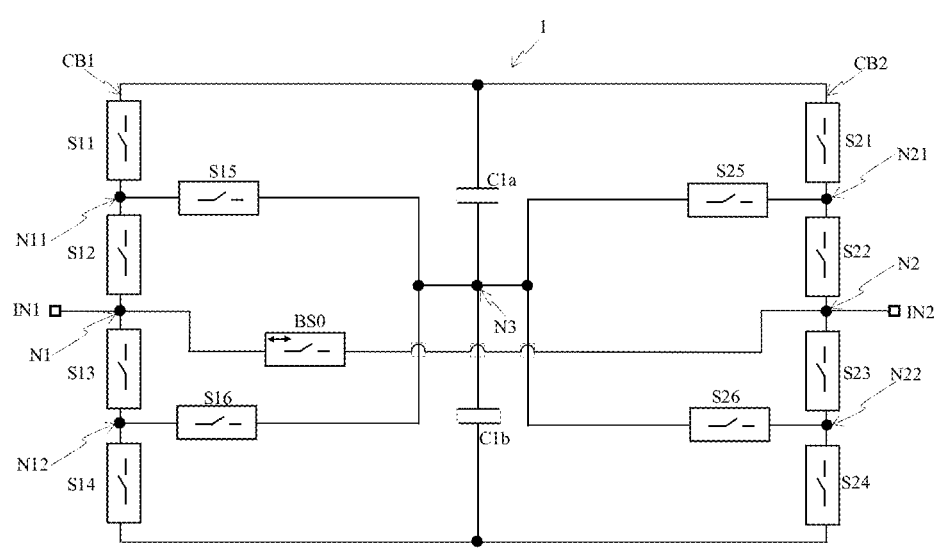
FIG. 9 shows an AC/DC converter stage according to an embodiment, the AC/DC converter stage comprising a full bridge structure.

FIG. 9 shows an AC/DC converter stage according to an embodiment, the AC/DC converter stage comprising a full bridge structure. The above description of the AC/DC converter stage according to FIG. 7 is correspondingly valid for the AC/DC converter stage 1 of FIG. 9. The AC/DC converter stage 1 according to FIG. 9 differs from the AC/DC converter stage according to FIG. 7, in that the first circuit branch CB1 and the second circuit branch CB2 of the AC/DC converter stage 1 according to FIG. 9 each comprise more than two switches. Therefore, in the following the differences between the AC/DC converter stage of FIG. 7 and the AC/DC converter stage of FIG. 9 are described.

The AC/DC converter stage 1 according to FIG. 9 differs from the AC/DC converter stage according to FIG. 4, in that the AC/DC converter stage of FIG. 9 includes a full bridge structure, whereas the AC/DC converter stage of FIG. 4 includes a half bridge structure. Therefore, the above description of the AC/DC converter stage according to FIG. 4 is correspondingly valid for the AC/DC converter stage shown in FIG. 9.

According to FIG. 9, the first circuit branch CB1 of the AC/DC converter stage 1 includes four switches S11, S12, S13 and S14 that are electrically connected in series. The switches S12 and S13 are electrically connected at the first connection point N1, to which the first input terminal IN1 is connected to. The switches S11 and S12 are electrically connected at the connection point N11 and the switches S13 and S14 are electrically connected at the connection point N12. The second circuit branch CB2 of the AC/DC converter stage 1 includes four switches S21, S22, S23 and S24 that are electrically connected in series. The switches S22 and S23 are electrically connected at the second connection point N2, to which the second input terminal IN2 is connected to. The switches S21 and S22 are electrically connected at the connection point N21 and the switches S23 and S24 are electrically connected at the connection point N22.

The AC/DC converter stage 1 according to FIG. 9 is advantageous with respect to the AC/DC converter stage according to FIG. 7. Namely, since the circuit branches CB1 and CB2 each comprise more than two switches (four switches S11, S12, S13, S14 of CB1, four switches S21, S22, S23, S24 of CB2), switches configured for lower electrical powers and, thus, cheaper and less bulky switches may be used for the same AC input voltage. Namely, the AC input voltage is divided across the respective switches (i.e. across switches S11, S12, S21 and S22 respectively across switches S13, S14, S23 and S24) of the first and second circuit branch CB1 and CB2 when the AC input voltage is present between the two input terminals IN1 and IN2. This is advantageous, as using cheaper and less bulky switches may decrease the costs for implementing the first and second circuit branch CB1 and CB2 of the AC/DC converter stage, and may decrease the size of the AC/DC converter stage.

Further, according to FIG. 9, the first electrical storage C1 includes or corresponds to two first electrical storage elements in form of two output capacitors C1a and C1b that are electrically connected in series at a third connection point N3. The third connection point N3 is electrically connected to the connection point N11 via a switch S15, to the connection point N12 via a switch S16, to the connection point N21 via a switch S25 and to the connection point N22 via a switch S26.

The switch S15 ensures an equal voltage drop across the switches S11 and S12 of the first circuit branch CB1, such that the switches S11 and S12 of the first circuit branch CB1 are equally stressed. The switch S16 ensures an equal voltage drop across the switches S13 and S14 of the first circuit branch CB1, such that the switches S13 and S14 of the first circuit branch CB1 are equally stressed. The same applies to the corresponding switches S25 and S26 and switches S21, S22, S23 and S24 of the second circuit branch CB2. Therefore, the switches S15, S16, S25 and S26 ensure an equal voltage drop across the respective switches of the first and second circuit branch CB1 and CB2 such that the switches S11, S12, S13 and S14 of the first circuit branch CB1 and the switches S21, S22, S23 and S24 of the second circuit branch CB2 are equally stressed.

According to an embodiment, the number of switches of the first circuit branch CB1 and/or the number of switches of the second circuit branch CB2 may be greater than, the number of switches (four switches S11, S12, S13 and S14 of CB1, four switches S21, S22, S23 and S24 of CB2) shown in FIG. 9. Accordingly, the number of switches for ensuring an equal voltage drop across respective switches of the first circuit branch CB1 and/or the number of switches for ensuring an equal voltage drop across respective switches of the second circuit branch CB2 may be greater than, the number (two switches S15 and S16 for CB1, two switches S25 and S26 for CB2) shown in FIG. 9.

FIGS. 10 (a) and (b) show two exemplary implementations of the AC/DC converter stage shown in FIG. 9. The above description of the AC/DC converter stage of FIG. 9 is correspondingly valid for the two exemplary implementations shown in FIGS. 10 (a) and (b). The AC/DC converter stage 1 according to FIG. 10 differs from the AC/DC converter stage according to FIG. 5, in that the AC/DC converter stage of FIG. 10 includes a full bridge structure, whereas the AC/DC converter stage of FIG. 5 includes a half bridge structure. Therefore, the above description of the two exemplary implementations of the AC/DC converter stage according to FIGS. 5 (a) and (b) is correspondingly valid for the two exemplary implementations of the AC/DC converter stage shown in FIGS. 10 (a) and (b).

According to FIG. 10 (a), the AC/DC converter stage 1 includes as the four switches S11, S12, S13 and S14 of the first circuit branch CB1 four controllable semiconductor switches Q11, Q12, Q13 and Q14 in form of four IGBTs. Further, the AC/DC converter stage 1 includes as the four switches S21, S22, S23 and S24 of the second circuit branch CB2 four controllable semiconductor switches Q21, Q22, Q23 and Q24 in form of four IGBTs. A diode is electrically connected in parallel to each IGBT, where the anode of the diode is connected to the emitter terminal of the respective IGBT and the cathode of the diode is connected to the collector terminal of the respective IGBT.

The emitter terminal of the IGBT Q11 and the collector terminal of the IGBT Q12 are electrically connected at the connection point N11. The emitter terminal of the IGBT Q12 and the collector terminal of the IGBT Q13 are electrically connected at the first connection point N1. The emitter terminal of the IGBT Q13 and the collector terminal of the IGBT Q14 are electrically connected at the connection point N12. The emitter terminal of the IGBT Q21 and the collector terminal of the IGBT Q22 are electrically connected at the connection point N21. The emitter terminal of the IGBT Q22 and the collector terminal of the IGBT Q23 are electrically connected at the second connection point N2. The emitter terminal of the IGBT Q23 and the collector terminal of the IGBT Q24 are electrically connected at the connection point N22. Thus, the AC/DC converter stage 1 of FIG. 10 (a) corresponds to an actively switched AC/DC converter stage, where the AC/DC conversion is achieved by controlling the eight IGBTs Q11, Q12, Q13, Q14, Q21, Q22, Q23 and Q24. The eight IGBTs Q11, Q12, Q13, Q14, Q21, Q22, Q23 and Q24 may be controlled by a control unit. The controllable bidirectional switch BS0 of the AC/DC converter stage of FIG. 10 (a) is implemented as described with respect to the controllable bidirectional switch BS0 of the AC/DC converter stage of FIG. 8 (a).

According to FIG. 10 (a) the switches S15, S16, S25 and S26 of the AC/DC converter stage 1 are implemented as controllable semiconductor switches Q15, Q16, Q25 and Q26 in form of IGBTs, respectively, where a diode is electrically connected in parallel to each IGBT. The anode of the diode is connected to the emitter terminal of the respective IGBT and the cathode of the diode is connected to the collector terminal of the respective IGBT. The collector terminal of the IGBT Q15 is connected to the connection point N11 and the emitter terminal of the IGBT Q15 is connected to the third connection point N3. The emitter terminal of the IGBT Q16 is connected to the connection point N12 and the collector terminal of the IGBT Q16 is connected to the third connection point N3. The collector terminal of the IGBT Q25 is connected to the connection point N21 and the emitter terminal of the IGBT Q25 is connected to the third connection point N3. The emitter terminal of the IGBT Q26 is connected to the connection point N22 and the collector terminal of the IGBT Q26 is connected to the third connection point N3. The IGBTs Q15, Q16, Q25 and Q26 may be controlled to ensure an equal voltage drop across the IGBTs Q11, Q12, Q13, Q14, Q21, Q22, Q23 and Q24 of the first and second circuit branch CB1 and CB2 such that the IGBTs Q11, Q12, Q13, Q14, Q21, Q22, Q23 and Q24 are equally stressed.

The AC/DC converter stage of FIG. 10 (b) differs from the AC/DC converter stage of FIG. 10 (a) with respect to the implementation of the four switches S15, S16, S25 and S26. Namely, according to FIG. 10 (b) the AC/DC converter stage 1 includes as the four switches S15, S16, S25 and S26 four uncontrollable unidirectional semiconductor switches D15, D16, D25 and D26 in the form of four diodes. The cathode of the diode D15 is connected to the connection point N11 and the anode of the diode D15 is connected to the third connection point N3. The anode of the diode D16 is connected to the connection point N12 and the cathode of the diode D16 is connected to the third connection point N3. The cathode of the diode D25 is connected to the connection point N21 and the anode of the diode D25 is connected to the third connection point N3. The anode of the diode D26 is connected to the connection point N22 and the cathode of the diode D26 is connected to the third connection point N3. In both embodiments of FIG. 10 the controllable bidirectional switch BS0 may be controlled/switched by a control unit in order to achieve the improved common mode performance, as outlined already above.

According to FIGS. 10(a) and 10(b), the switches S11, S12, S13, S14, S21, S22, S23 and S24 of the circuit branches CB1 and CB2 are of the same switch type. According to an embodiment, at least one switch of the circuit branches CB1 and CB2 may be of a different switch type, as outlined already above (not shown in FIG. 10). According to a further embodiment, the switches S11, S12, S13, S14, S21, S22, S23 and S24 of the circuit branches CB1 and CB2 may be of a different switch type compared to the one shown in FIGS. 10 (a) and 10 (b). For example, they may be a different type of controllable semiconductor switch or they may be an uncontrollable unidirectional switch type, such as diodes. According to FIGS. 10 (a) and (b), the switches S15, S16, S25 and S26 are of the same switch type. According to an embodiment, at least one of the switches S15, S16, S25 and S26 may be of a different switch type, as outlined already above (not shown in FIG. 10).

Figure 11:
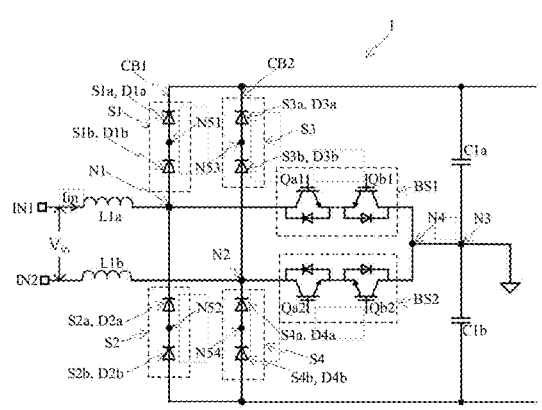
FIG. 11 (a) shows an AC/DC converter stage according to an embodiment, the AC/DC converter stage comprising a full bridge structure.
Figure 11:
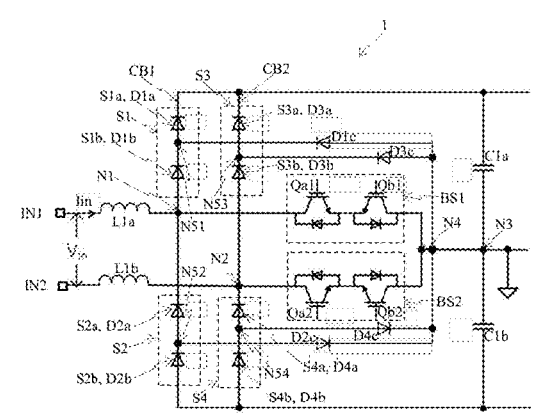

FIGS. 11 (a) and (b) each show an AC/DC converter stage according to an embodiment, the AC/DC converter stage comprising a full bridge structure. The above description of the AC/DC converter stage according to FIG. 7 is correspondingly valid for the AC/DC converter stage 1 of FIGS. 11 (a) and (b). The AC/DC converter stage 1 according to FIGS. 11 (a) and (b) differs from the AC/DC converter stage according to FIG. 7, in that each switch of the four switches S1, S2, S3 and S4 of the circuit branches CB1 and CB2 of the AC/DC converter stage 1 according to FIGS. 11 (a) and (b) includes two switches electrically connected in series and in that the AC/DC converter stage of FIGS. 11 (a) and (b) includes two controllable bidirectional switches. Therefore, in the following the differences between the AC/DC converter stage of FIG. 7 and the AC/DC converter stage of FIGS. 11 (a) and (b) are described.

The AC/DC converter stage 1 according to FIGS. 11 (a) and (b) differs from the AC/DC converter stage according to FIG. 6 in that the AC/DC converter stage of FIGS. 11 (a) and (b) includes a full bridge structure, whereas the AC/DC converter stage of FIG. 6 includes a half bridge structure. Moreover, the converter stage of FIGS. 11 (a) and (b) includes as switches of the first and second circuit branch uncontrollable unidirectional semiconductor switches in form of diodes. Therefore, the above description of the AC/DC converter stage according to FIG. 6 is correspondingly valid for the embodiments of FIGS. 11 (a) and 11 (b).

According to the embodiment of FIG. 11 (a), the AC/DC converter stage 1 includes two controllable bidirectional switches BS1 and BS2 electrically connected in series at a fourth connection point N4. The two controllable bidirectional switches BS1 and BS2 are configured to provide in their conducting states a low impedance current path between the two input terminals IN1 and IN2. According to FIG. 11 (a), the controllable bidirectional switch BS1 is connected between the first connection point N1 of the first circuit branch CB1 and the fourth connection point N4. The controllable bidirectional switch BS2 is connected between the fourth connection point N4 and the second connection point N2 of the second circuit branch CB2.

The fourth connection point N4 is electrically connected to the third connection point N3 between the two output capacitors C1a and C1b that form the first electrical storage C1 for providing a DC output voltage. This ensures that the AC input voltage is equally divided among the two controllable bidirectional semiconductor switches BS1 and BS2. The two controllable bidirectional switches BS1 and BS2 of the AC/DC converter stage of FIG. 11 (a) are each implemented as described with respect to the controllable bidirectional switch BS0 of the AC/DC converter stage of FIG. 8 (a).

Since the AC/DC converter stage 1 includes two controllable bidirectional switches BS1 and BS2, controllable bidirectional switches configured for lower electrical powers and, thus, cheaper and less bulky switches, may be used for the same AC input voltage, because the AC input voltage is divided across the two controllable bidirectional switches BS1 and BS2. This is advantageous, as using cheaper and less bulky switches may decrease the costs for implementing the two controllable bidirectional switches BS1 and BS2 of the AC/DC converter stage and may decrease the size of the AC/DC converter stage.

Moreover, increasing the number of controllable bidirectional switches from one controllable bidirectional switch BS0 (as it is the case in the AC/DC converter stage of FIG. 7) to two controllable bidirectional switches BS1 and BS2 (as it is the case in FIG. 11), allows increasing the AC input voltage input to the AC/DC converter stage. Namely, the AC input voltage is divided across the two controllable bidirectional switches BS1 and BS2. This is advantageous, as in case the AC/DC converter stage 1 is used as a first converter stage in converter units of a converter system that are electrically connected in series at the input of the converter system (not shown in FIG. 11, but in FIGS. 13 to 15) less converter units are needed for the same AC input voltage. Namely, each converter unit can deal with a higher input voltage due to the two controllable bidirectional switches BS1 and BS2.

As shown in FIG. 11 (a), with respect to the first circuit branch CB1, the switch S1 includes two switches S1a and S1b in form of two diodes D1a and D1b electrically connected at a connection point N51 and the switch S2 includes two switches S2a and S2b in form of two diodes D2a and D2b electrically connected at a connection point N52. The anode of the diode D1a and the cathode of the diode D1b are connected to the connection point N51 and, thus, the anode of the diode D1b is connected to the first connection point N1. The cathode of the diode D2b and the anode of the diode D2a are connected to the connection point N52 and, thus, the cathode of the diode D2a is connected to the first connection point N1.

With respect to the second circuit branch CB2, the switch S3 includes two switches S3a and S3b in form of two diodes D3a and D3b electrically connected at a connection point N53 and the switch S4 includes two switches S4a and S4b in form of two diodes D4a and D4b electrically connected at a connection point N54. The anode of the diode D3a and the cathode of the diode D3b are connected to the connection point N53 and, thus, the anode of the diode D3b is connected to the first connection point N1. The cathode of the diode D4b and the anode of the diode D4a are connected to the connection point N54 and, thus, the cathode of the diode D4a is connected to the second connection point N2. That is, each switch S1/S2/S3/S4 of the circuit branches CB1 and CB2 includes two switches S1a, S1b/S2a, S2b/to S3a, S3b/S4a, S4b in form of two diodes D1a, D1b/D2a, D2b/D3a, D3b/D4a, D4b that are connected in series at a fifth connection point N51/N52/N53/N54.

Since each switch of the first and second circuit branch CB1 and CB2 includes two switches, switches configured for lower electrical powers and, thus, cheaper and less bulky switches may be used for the same AC input voltage. Namely, the voltage across the switch S1 is divided across the corresponding two switches S1a and S1b, and the voltage across the switch S2 is divided across the corresponding switches S2a and S2b. The same applies for the two switches S3 and S4 of the second circuit branch CB2. This is advantageous, as using cheaper and less bulky switches may decrease the costs for implementing the switches S1, S2, S3 and S4 of the circuit branches CB1 and CB2 of the AC/DC converter stage, and may decrease the size of the AC/DC converter stage.

According to the embodiment of FIG. 11 (a), the AC/DC converter stage 1 includes two second electrical storages in the form of two inductors or chokes L1a and L1b. The first input terminal IN1 is electrically connected via the second electrical storage L1a to the two controllable bidirectional switches BS1 and BS2, such as to the controllable bidirectional switch BS1. Namely, the first input terminal IN1 is electrically connected via the second electrical storage L1a to the first connection point N1 of the first circuit branch CBE The second input terminal IN2 is electrically connected via the second electrical storage L1b to the two controllable bidirectional switches BS1 and BS2, such as to the controllable bidirectional switch BS2. Namely, the second input terminal IN2 is electrically connected via the second electrical storage L1b to the second connection point N2 of the second circuit branch CB2. Alternatively, the AC/DC converter stage may comprise only one second electrical storage and either the first input terminal IN1 or the second input terminal IN2 is electrically connected via the second electrical storage to the two controllable bidirectional switches BS1 and BS2 (not shown in FIG. 11 (a)).

The AC/DC converter stage of FIG. 11 (b) corresponds to the AC/DC converter stage of FIG. 11 (a), where the AC/DC converter stage of FIG. 11 (b) includes additional electronic elements. Therefore, the description of the AC/DC converter stage of FIG. 11 (a) is also valid for the AC/DC converter stage of FIG. 11 (b) and in the following only the additional electronic elements are described.

According to the embodiment of FIG. 11 (b), the AC/DC converter stage 1 includes four low current diodes D1c, D2c, D3c and D4c. The cathode of the diode D1c is connected to the connection point N51 and the anode of the diode D1c is connected to the third connection point N3 between the two output capacitors C1a and C1b. The anode of the diode D2c is connected to the connection point N52 and the cathode of the diode D2c is connected to the third connection point N3. The cathode of the diode D3c is connected to the connection point N53 and the anode of the diode D3c is connected to the third connection point N3. The anode of the diode D4c is connected to the connection point N54 and the cathode of the diode D4c is connected to the third connection point N3.

According to the embodiment of FIG. 11 (b), each switch of the switches S1, S2, S3 and S4 of the circuit branches CB1 and CB2 includes one slow recovery diode and one fast recovery diode, where the low current diodes D1c, D2c, D3c and D4c are configured for providing a recovery charge. For example, the switches S1b, S2a, S3b and S4a each may be implemented as a slow recovery diode and the switches S1a, S2b, S3a and S4b each may be implemented as a fast recovery diode. Using one slow recovery diode and one fast recovery diode for each switch S1, S2, S3 and S4 of the circuit branches CB1 and CB2 of the AC/DC converter stage 1 reduces costs, because slow recovery diodes are cheaper than fast recovery diodes.

Figure 12:
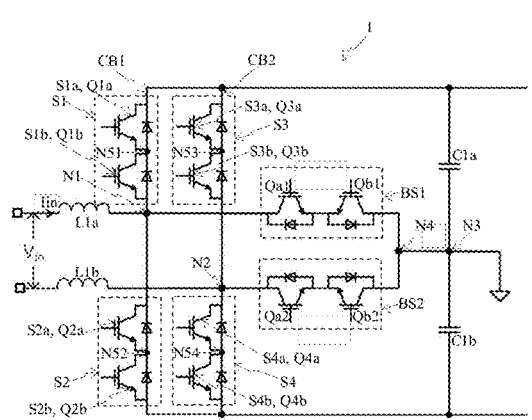
FIG. 12 (a) each show an AC/DC converter stage according to an embodiment, the AC/DC converter stage comprising a full bridge structure.
Figure 12:
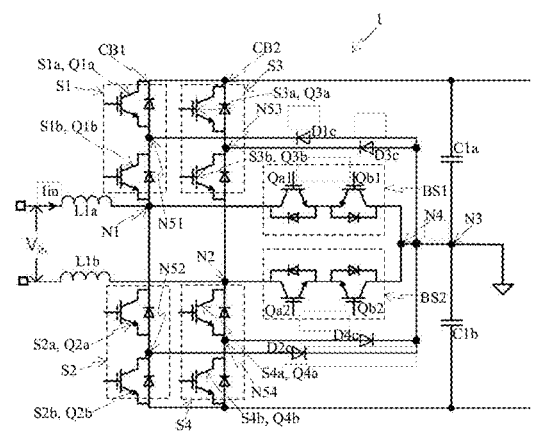

FIGS. 12 (a) and (b) each show an AC/DC converter stage according to an embodiment, the AC/DC converter stage comprising a full bridge structure. The AC/DC converter stage 1 according to FIGS. 12 (a) and (b) differs from the corresponding AC/DC converter stage according to FIGS. 11 (a) and (b) with respect to the switches of the circuit branches CB1 and CB2. According to the embodiments of FIGS. 11 (a) and (b), the switches of the circuit branches correspond to diodes, whereas according to the embodiments of FIGS. 12 (a) and (b) the switches of the circuit branches correspond to IGBTs. Therefore, the above description of the AC/DC converter stage according to FIGS. 11 (a) and (b) is correspondingly valid for the AC/DC converter stage 1 of FIGS. 12 (a) and (b) and in the following the differences between the AC/DC converter stages of FIG. 11 and the AC/DC converter stages of FIG. 12 are described.

As shown in FIG. 12 (a), with respect to the first circuit branch CB1, the switch S1 includes two switches S1a and S1b in form of two IGBTs Q1a and Q1b electrically connected at a connection point N51 and the switch S2 includes two switches S2a and S2b in form of two IGBTs Q2a and Q2b electrically connected at a connection point N52. The emitter terminal of the IGBT Q1a and the collector terminal of the IGBT Q1b are connected to the connection point NM and, thus, the emitter terminal of the IGBT Q1b is connected to the first connection point N1. The collector terminal of the IGBT Q2b and the emitter terminal of the IGBT Q2a are connected to the connection point N52 and, thus, the collector terminal of the IGBT Q2a is connected to the first connection point N1.

With respect to the second circuit branch CB2, the switch S3 includes two switches S3a and S3b in form of two IGBTs Q3a and Q3b electrically connected at a connection point N53 and the switch S4 includes two switches S4a and S4b in form of two IGBTs Q4a and Q4b electrically connected at a connection point N54. The emitter terminal of the IGBT Q3a and the collector terminal of the IGBT Q3b are connected to the connection point N53 and, thus, the emitter terminal of the IGBT Q3b is connected to the second connection point N2. The collector terminal of the IGBT Q4b and the emitter terminal of the IGBT Q4a are connected to the connection point NM and, thus, the collector terminal of the IGBT Q4a is connected to the second connection point N2.

A diode is electrically connected in parallel to each IGBT, where the anode of the diode is connected to the emitter terminal of the respective IGBT and the cathode of the diode is connected to the collector terminal of the respective IGBT. That is, each switch S1/S2/S3/S4 of the circuit branches CB1 and CB2 includes two switches S1a, S1b/S2a, S2b/S3a, S3b/S4a, S4b in form of two IGBTs Q1a, Q1b/Q2a, Q2b/Q3a, Q3b/Q4a, Q4b that are connected in series at a fifth connection point N51/N52/N53/N54.

Since each switch of the first and second circuit branch CB1 and CB2 includes two switches, switches configured for lower electrical powers and, thus, cheaper and less bulky switches may be used for the same AC input voltage. Namely, the voltage across the switch S1 is divided across the corresponding two switches S1a and S1b, and the voltage across the switch S2 is divided across the corresponding switches S2a and S2b. The same applies for the two switches S3 and S4 of the second circuit branch CB2. This is advantageous, as using cheaper and less bulky switches may decrease the costs for implementing the switches S1, S2, S3 and S4 of the circuit branches CB1 and CB2 of the AC/DC converter stage and may decrease the size of the AC/DC converter stage. With respect to the two controllable bidirectional switches BS1 and BS2 and the two second electrical storages L1a and L1b of the AC/DC converter stage 1 of FIG. 12 (a) reference is made to the corresponding description of the AC/DC converter stage of FIG. 11 (a). According to a further embodiment, a different type of controllable semiconductor switch instead of an IGBT may be used for the switches S1a, S1b, S2a, S2b, S3a, S3b, S4a and S4b.

The AC/DC converter stage of FIG. 12 (b) corresponds to the AC/DC converter stage of FIG. 12 (a), where the AC/DC converter stage of FIG. 12 (b) includes additional electronic elements. Therefore, the description of the AC/DC converter stage of FIG. 12 (a) is also valid for the AC/DC converter stage of FIG. 12 (b) and in the following only the additional electronic elements are described.

According to the embodiment of FIG. 12 (b), the AC/DC converter stage 1 includes four low current diodes D1c, D2c, D3c and D4c. The cathode of the diode D1c is connected to the connection point N51 and the anode of the diode D1c is connected to the third connection point N3 between the two output capacitors C1a and C1b. The anode of the diode D2c is connected to the connection point N52 and the cathode of the diode D2c is connected to the third connection point N3. The cathode of the diode D3c is connected to the connection point N53 and the anode of the diode D3c is connected to the third connection point N3. The anode of the diode D4c is connected to the connection point N54 and the cathode of the diode D4c is connected to the third connection point N3.

The low current diodes D1c, D2c, D3c and D4c are configured for ensuring equal voltage drop at the IGBTs of the circuit branches CB1 and CB2. With respect to the first circuit branch CB1, the low current diode D1c is configured for ensuring equal voltage drop across the IGBTs Q1a and Q1b of the switch S1 and the low current diode D2c is configured for ensuring equal voltage drop across the IGBTs Q2*a* and Q2*b* of the switch S2. With respect to the second circuit branch CB2, the low current diode D3*c* is configured for ensuring equal voltage drop across the IGBTs Q3*a* and Q3*b* of the switch S3 and the low current diode D4*c* is configured for ensuring equal voltage drop across the IGBTs Q4*a* and Q4*b* of the switch S4.

According to an embodiment, with respect to each switch S1, S2, S3 and S4 comprising two IGBTs, a slow recovery diode may be connected in parallel to one IGBT and a fast recovery diode may be connected in parallel to the other IGBT of each switch. For example, a slow recover diode may be connected in parallel to the IGBTs Q1*b*, Q2*a*, Q3*b* and Q4*a* and a fast recovery diode may be connected in parallel to the other IGBTs Q1*a*, Q2*b*, Q3*a* and Q4*b*. This reduces costs because slow recovery diodes are cheaper than fast recovery diodes.

Figure 13:
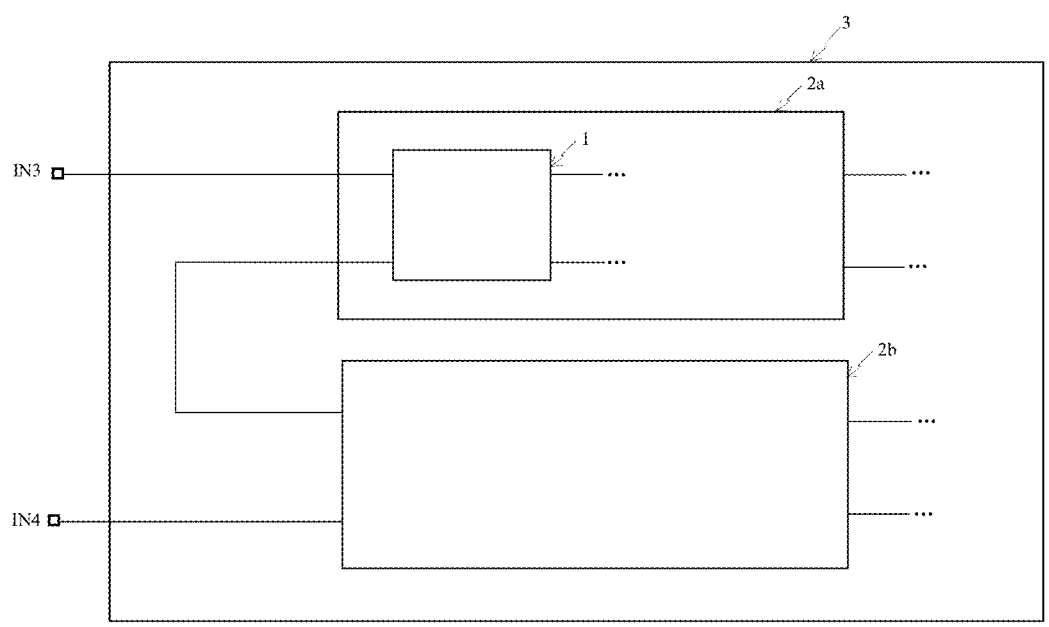
FIG. 13 shows a converter system according to an embodiment.

FIG. 13 shows a converter system according to an embodiment. The above description with respect to a converter system according to a second embodiment and its implementation forms is correspondingly valid for the converter system 3 of FIG. 13. According to FIG. 13, the converter system 3 includes an input with two input terminals IN3 and IN4 and two converter units 2*a* and 2*b*. The converter system 3 includes an input series structure. That is, the two converter units 2*a* and 2*b* are electrically connected in series at the input of the converter system 3. According to an embodiment, the converter system 3 may comprise more than two converter units, where these converter units are electrically connected in series at the input of the converter system 3 (not shown in FIG. 13).

Irrespective of the number of converter units, i.e. whether the converter system includes two converter units 2*a* and 2*b* (as shown in FIG. 13) or more than two converter units, at least one of the converter units includes as a first converter stage an AC/DC converter stage 1 according to a first embodiment and its implementation forms, as described above. At least one of the converter units of the converter system 3 may include as a first converter stage an AC/DC converter stage 1 according to any one of FIGS. 1 to 12, as described above. Each converter unit of the converter system 3 may include an AC/DC converter stage 1 as a first converter stage.

At least one converter unit of the converter system 3 may be packaged in an enclosure (not shown in FIG. 13). Each converter unit of the converter system 3 may be packaged in an enclosure. The enclosure may be a metal enclosure electrically connected to ground potential. Between the packaged converter unit(s) of the converter system 3, a solid insulation material may be present.

The two converter units 2*a* and 2*b* of the converter system 3 each may provide a DC output voltage without being electrically connected to each other at the output of the converter system 3 (not shown in FIG. 13). Alternatively, the two converter units 2*a* and 2*b* may be electrically connected in series or in parallel at the output of the converter system 3 (not shown in FIG. 13). That is, the converter system 3 may comprise an input series output series (ISOS) structure, i.e. the two converter units 2*a* and 2*b* are electrically connected in series at the input and in series at the output of the converter system 3. Alternatively, the converter system 3 may comprise an input series output parallel (ISOP) structure, i.e. the two converter units 2*a* and 2*b* are electrically connected in series at the input and in parallel at the output of the converter system 3. The above is also valid when the converter system 3 includes more than two converter units (not shown in FIG. 13).

An AC input voltage input to the converter system 3 at the input terminals IN3 and IN4 is present across the two converter units 2*a* and 2*b* that are electrically connected in series at the input of the converter system 3. Therefore, the input voltage of each converter unit may correspond to the input voltage of the converter system divided by the number of converter units of the converter system 3. In case each converter unit of the converter system 3 includes an AC/DC converter stage 1 as a first converter stage: the higher the AC input voltage for which the AC/DC converter stages 1 are configured for, the lower can be the number of converter units of the converter system 3. A control unit may control the converter units of the converter system 3. The converter system 3 may include the control unit (not shown in FIG. 13).

Figure 14:
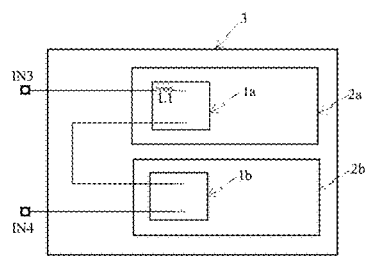
FIG. 14 (a) shows a converter system according to an embodiment.
Figure 14:
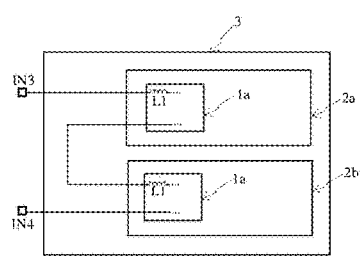
Figure 14:
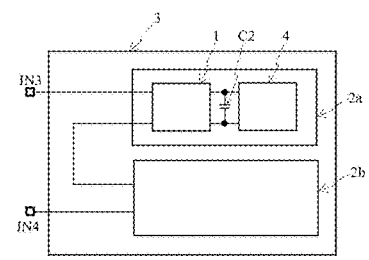

FIGS. 14 (*a*), (*b*) and (*c*) each show a converter system according to an embodiment. The description with respect to the converter system of FIG. 13 is correspondingly valid for the converter system of FIGS. 14 (*a*), (*b*) and (*c*). FIGS. 14 (*a*), (*b*) and (*c*) show exemplary implementations of the converter system of FIG. 13. According to the embodiment of FIG. 14 (*a*), each converter unit of the two converter units 2*a* and 2*b* includes an AC/DC converter stage as a first converter stage. The AC/DC converter stage 1*a* of the converter unit 2*a* includes a second electrical storage L1, such as an inductor or choke, and, thus, corresponds to a bipolar boost converter configured for a boost operation. The AC/DC converter stage 1*b* of the converter unit 2*b* does not comprise such a second electrical storage L1 and, thus, on its own is not configured for a boost operation. Nevertheless, since the two converter units 2*a* and 2*b* are connected in series at the input of the converter system 3, the two converter units 2*a* and 2*b* may be controlled together to perform a boost operation using the single second electrical storage L1 of the AC/DC converter stage 1*a* of the converter unit 2*a*.

The converter system 3 of FIG. 14 (*a*) may comprise more than two converter units (not shown in FIG. 14 (*a*)), where each further converter unit besides the two converter units 2*a* and 2*b* may comprise an AC/DC converter stage 1*b* without a second electrical storage L1. The converter system according to FIG. 14 (*b*) differs from the converter system of FIG. 14 (*a*) in that each converter unit of the converter system 3 of FIG. 14 (*b*) includes an AC/DC converter stage 1*a* with a second electrical storage L1. That is, according to the embodiment of FIG. 4 (*b*), each converter unit of the converter system 3 includes an AC/DC converter stage 1*a* being a bipolar boost converter. The above description of the converter system of FIG. 14 (*a*) is correspondingly valid for the converter system 3 of FIG. 14 (*b*).

According to FIG. 14 (*c*), at least the converter unit 2*a* of the converter units 2*a* and 2*b* of the converter system 3 includes an AC/DC converter stage 1 as a first converter stage and a galvanic isolated DC/DC converter stage 4 as a second converter stage following the AC/DC converter stage 1. The AC/DC converter stage 1 is configured to supply the galvanically isolated DC/DC converter stage 4 with a DC input voltage. The galvanically isolated DC/DC converter stage may comprise a solid-state transformer (SST) that provides the galvanic isolation.

According to FIG. 14 (*c*), an optional capacitor C2 may be present between the AC/DC converter stage 1 and the galvanically isolated DC/DC converter stage 4 for storing the output DC voltage of the AC/DC converter stage 1 and providing a DC input voltage to the galvanically isolated DC/DC converter stage 4. The capacitor C2 may correspond to the first electrical storage of the AC/DC converter stage 1 for providing a DC output voltage of the AC/DC converter stage 1. Each converter unit of the converter system 3 may be implemented as the converter unit 2a.

Figure 15:
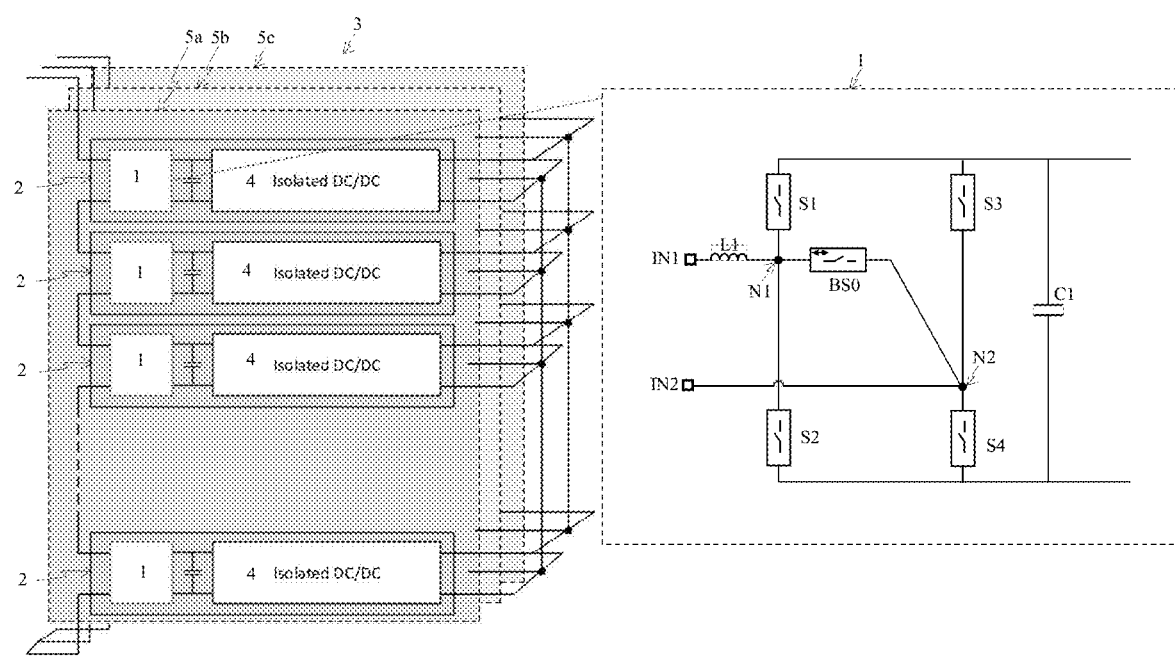
FIG. 15 shows a converter system according to an embodiment.

FIG. 15 shows a converter system according to an embodiment. The converter system 3 of FIG. 15 includes three phase units 5a, 5b and 5c for an input AC voltage with three phases. Each phase unit of the converter system 3 may be implemented as the converter systems described above with respect to FIGS. 13 and 14 (*a*), (*b*) and (*c*). Therefore, the above description of the converter systems according to FIGS. 13 and 14 (*a*), (*b*) and (*c*) is correspondingly valid for each phase unit of the converter system 3 of FIG. 15.

According to FIG. 15, the phase unit 5a includes two or more converter units 2 (in FIG. 15 four converter units 2 are shown) that are electrically connected in series at the input of the converter system 3. According to FIG. 15, the output of the converter units 2 of the phase unit 5a are electrically connected in parallel at the output of the converter system 3. Alternatively, the converter units 2 of the phase unit 5a may be connected in series at the output. According to a further alternative, the converter units 2 of the phase unit 5a each may provide a DC output voltage without being electrically connected to each other at the output.

As shown in FIG. 15, each converter unit 2 of the phase unit 5a includes an AC/DC converter stage 1 as a first converter stage and a galvanically isolated DC/DC converter stage 4 as a second converter stage. The AC/DC converter stage 1 is configured to provide a DC input voltage to the galvanically isolated DC/DC converter stage 4. In addition, each converter unit 2 includes an optional capacitor between the AC/DC converter stage 1 and the galvanically isolated DC/DC converter stage for storing a DC voltage. The capacitor may correspond to the first electrical storage of the AC/DC converter stage 1 for providing a DC output voltage of the AC/DC converter stage 1.

According to an embodiment, only the AC/DC converter stage 1 of the top converter unit 2 of the phase unit 5a includes a second electrical storage L1 and, thus, is a bipolar boost converter. Nevertheless, since the converter units 2 of the phase unit 5a are connected in series at the input of the converter system 3, the converter units 2 may be controlled together to perform a boost operation using the single second electrical storage L1 of the AC/DC converter stage 1 of the one converter unit. According to a further embodiment, the AC/DC converter stage 1 of each converter unit 2 of the phase unit 5a includes the second electrical storage L1 and, thus, is a bipolar boost converter.

On the right side of FIG. 15, an AC/DC converter stage 1 with a full bridge structure is shown as an example for the AC/DC converter stage of the converter units 2 of the phase unit 5a of the converter system 3. This AC/DC converter stage 1 essentially corresponds to the AC/DC converter stage 1 of FIG. 7, with the only difference, that the AC/DC converter stage 1 on the right side of FIG. 15 includes a second electrical storage L1 between the first input terminal IN1 and the first connection point N1 and, thus, is a bipolar boost converter. The AC/DC converter stage 1 of the converter units 2 of the phase unit 5a may be differently implemented in line with the description of the AC/DC converter stage according to a first embodiment and its implementation forms. The AC/DC converter stage 1 of the converter units 2 of the phase unit 5a may correspond to any one of the AC/DC converter stages shown in FIGS. 1 to 12. The galvanically isolated DC/DC converter 4 of the converter units 2 of the phase unit 5a may comprise a solid-state transformer (SST) that provides the galvanic isolation.

At least one converter unit 2 of the phase unit 5a of the converter system 3 may be packaged in an enclosure (not shown in FIG. 15). Each converter unit 2 of the phase unit 5a is packaged in an enclosure. The enclosure may be a metal enclosure electrically connected to ground potential. Between the packaged converter unit(s) 2 of the phase unit 5a, a solid insulation material may be present. The above description with respect to the phase unit 5a is correspondingly valid for the other two phase units 5b and 5c of the converter system 3 of FIG. 15.

According to an embodiment, the converter system 3 may include only one phase unit that may be implemented in line with the phase unit 5a, as described above. According to a further embodiment, the converter system 3 may comprise two phase units that may be implemented in line with the phase unit 5a, as described above. According to a further embodiment, the converter system 3 may include more than three phase units, where each phase unit may be implemented in line with the phase unit 5a, as described above.

Various embodiments as examples as well as implementations have been described. However, other variations can be understood and effected by those persons skilled in the art, from the studies of the drawings. A single element or other unit may fulfill the functions of several entities or items recited in the embodiments. The mere fact that certain measures are recited in the embodiments does not indicate that a combination of these measures cannot be used in an advantageous implementation.

The invention claimed is:

1. An AC/DC converter stage for a converter system with an input series structure, comprising:
    two input terminals configured to input an AC input voltage through at least one phase unit;
    at least a first circuit branch with at least two switches that are electrically connected in series at a first connection point, wherein a first input terminal of the two input terminals is electrically connected to the first connection point of the first circuit branch;
    at least one first electrical storage is configured to provide a DC output voltage and electrically connected in parallel to the first circuit branch; and
    at least one controllable bidirectional switch is electrically connected between the two input terminals.

2. The AC/DC converter stage according to claim 1, wherein the at least one controllable bidirectional switch is further configured to cause a zero state of the AC/DC converter stage by providing in its conducting state a low impedance current path between the two input terminals.

3. The AC/DC converter stage according to claim 1, wherein the AC/DC converter stage is a bipolar boost converter comprising a second electrical storage and one of the two input terminals is electrically connected via the second electrical storage to the at least one controllable bidirectional switch.

4. The AC/DC converter stage according to claim 3, wherein the at least one controllable bidirectional switch is further configured to cause the zero state of the AC/DC converter stage by providing in its conducting state a current path between the two input terminals via the second electrical storage.

5. The AC/DC converter stage according to claim 3, wherein the first input terminal of the two input terminals is electrically connected via the second electrical storage to the first connection point of the first circuit branch.

6. The AC/DC converter stage according to claim 1, further comprising:

a second circuit branch with at least two switches that are electrically connected in series at a second connection point, wherein the second circuit branch is electrically connected in parallel to the first circuit branch and the first electrical storage, wherein the second input terminal of the two input terminals is electrically connected to the second connection point of the second circuit branch.

7. The AC/DC converter stage according to claim 1, wherein the first electrical storage further comprises:
at least two first electrical storage elements electrically connected in series at a third connection point.

8. The AC/DC converter stage according to claim 7, wherein, when the AC/DC converter stage comprises only the first circuit branch, the second input terminal of the two input terminals is electrically connected to the third connection point.

9. The AC/DC converter stage according to claim 7, wherein, when the AC/DC converter stage comprises the first circuit branch and the second circuit branch, the third connection point is electrically connected to at least one connection point between two switches of the first circuit branch different to the first connection point via a first switch, and, when the first circuit branch comprises four switches electrically connected in series, the third connection point is electrically connected to at least one connection point between two switches of the second circuit branch different to the second connection point via a second switch, when the second circuit branch comprises four switches electrically connected in series.

10. The AC/DC converter stage according to claim 1, wherein the switches further comprise at least one of:
at least one diode,
at least one controllable semiconductor switch, and
at least one Insulated Gate Bipolar transistor (IGBT).

11. The AC/DC converter stage according to claim 1, wherein the at least one controllable bidirectional switch comprises at least two IGBTs.

12. The AC/DC converter stage according to claim 1, further comprising:
two controllable bidirectional switches electrically connected in series at a fourth connection point and configured to provide, in their conducting states, a current path between the two input terminals.

13. The AC/DC converter stage according to claim 12, wherein, when the AC/DC converter stage comprises the first circuit branch and the second circuit branch and the first electrical storage comprises the at least two first electrical storage elements electrically connected in series at the third connection point, the third connection point and the fourth connection point are electrically connected with each other.

14. The AC/DC converter stage according to claim 12, wherein, when the AC/DC converter stage comprises only the first circuit branch, each switch of the first circuit branch further comprises:
two diodes electrically connected in series at a fifth connection point, or
two IGBTs electrically connected in series at the fifth connection point, or
when the AC/DC converter stage comprises the first circuit branch and the second circuit branch, each switch of the first circuit branch and the second circuit branch further comprises:
two uncontrollable unidirectional semiconductor switches electrically connected in series at the fifth connection point, or
two IGBTs, electrically connected in series at the fifth connection point.

15. The AC/DC converter stage according to claim 14, wherein, when the first electrical storage comprises the at least two first electrical storage elements electrically connected in series at the third connection point, each switch further comprises:
one slow recovery diode and one fast recovery diode electrically connected in series at the fifth connection point, wherein, for each switch, a low current diode configured to provide a recovery charge is electrically connected between the fifth connection point and the third connection point; or each switch further comprises:
two controllable semiconductor switches electrically connected in series at the fifth connection point, wherein, for each switch, a low current diode configured to ensure an equal voltage drop at the two controllable semiconductor switches is electrically connected between the fifth connection point and the third connection point.

16. A converter system with an input series structure comprising:
at least one phase unit configured to receive an input AC voltage comprising at least two converter units that are electrically connected in series at the input of the converter system, wherein at least one converter unit of the at least two converter units comprises an AC/DC converter stage as a first converter stage, and the AC/DC-converter stage comprises:
two input terminals configured to input an AC input voltage (Vin) to the AC/DC converter stage;
at least a first circuit branch with at least two switches that are electrically connected in series at a first connection point, wherein a first input terminal of the two input terminals is electrically connected to the first connection point of the first circuit branch;
at least one first electrical storage configured to provide a DC output voltage, the first electrical storage being electrically connected in parallel to the first circuit branch; and
at least one controllable bidirectional switch electrically connected between the two input terminals.

17. The converter system according to claim 16, wherein each converter unit of the at least two converter units comprises the AC/DC converter stage as a first converter stage.

18. The converter system according to claim 16, wherein at least one converter unit of the at least two converter units comprises a galvanically isolated DC/DC converter stage as a second converter stage, and the corresponding AC/DC converter stage is configured to supply the isolated DC/DC converter stage with a DC input voltage.

19. The converter system according to claim 16, wherein at least one converter unit of the at least two converter units is packaged in an enclosure.

20. The converter system according to claim 16,
wherein each phase unit of the at least one phase unit further comprises the at least two converter units that are electrically connected in series at the input of the converter system.

* * * * *